United States Patent [19]
Fischel et al.

[11] Patent Number: 4,755,300
[45] Date of Patent: Jul. 5, 1988

[54] COUETTE MEMBRANE FILTRATION APPARATUS FOR SEPARATING SUSPENDED COMPONENTS IN A FLUID MEDIUM USING HIGH SHEAR

[75] Inventors: Richard J. Fischel, Minneapolis, Minn.; Robert C. Brumfield, Anaheim, Calif.

[73] Assignee: Haemonetics Corporation, Braintree, Mass.

[21] Appl. No.: 812,936

[22] Filed: Dec. 23, 1985

[51] Int. Cl.⁴ .............................................. B01D 13/00
[52] U.S. Cl. ......................................... 210/650; 55/59; 55/199; 210/321.68; 210/321.87; 210/782; 210/784; 422/101; 436/178
[58] Field of Search ............... 210/650, 652, 748, 780, 210/781, 782, 784, 321.1, 359, 360.1, 483, 497.01, 497.3, 651, 512.1, 90, 321.63, 321.67, 321.68, 321.87; 422/101; 436/177, 178; 55/52, 159, 199

[56] References Cited

U.S. PATENT DOCUMENTS

| | | | |
|---|---|---|---|
| 1,664,769 | 4/1928 | Chance | 210/360.1 X |
| 2,197,509 | 4/1940 | Reilly et al. | 210/297 |
| 2,398,233 | 4/1946 | Lincoln | 55/290 |
| 2,709,500 | 5/1955 | Carter | 55/408 |
| 3,026,871 | 3/1962 | Thomas | 261/DIG. 28 X |
| 3,183,908 | 5/1965 | Collins et al. | 261/DIG. 28 X |
| 3,355,382 | 11/1967 | Huntington | 210/321.1 |
| 3,396,103 | 8/1968 | Huntington | 210/497.01 X |
| 3,400,074 | 9/1968 | Grenci | 210/360.1 X |
| 3,491,887 | 1/1970 | Maestrelli | 210/637 |
| 3,567,030 | 3/1971 | Loeffler | 210/321.1 |
| 3,568,835 | 3/1971 | Hansen | 210/86 |
| 3,674,440 | 7/1972 | Kitrilakis | 261/87 |
| 3,705,100 | 12/1972 | Blatt | 210/456 X |
| 3,750,885 | 8/1973 | Fournier | 210/107 |
| 3,771,658 | 11/1973 | Brumfield | 210/321.3 |
| 3,771,899 | 11/1973 | Brumfield | 415/90 |
| 3,821,108 | 6/1974 | Manjikian | 210/321.1 X |
| 3,830,372 | 8/1974 | Manjikian | 210/321.1 |
| 3,883,434 | 5/1975 | Gayler | 210/330 |
| 4,212,741 | 7/1980 | Brumfield | 210/241 |
| 4,212,742 | 7/1980 | Solomon et al. | 210/456 X |
| 4,214,990 | 7/1980 | Joh | 210/456 X |

FOREIGN PATENT DOCUMENTS

| | | |
|---|---|---|
| 112152 | 6/1984 | European Pat. Off. . |
| 8502783 | 7/1985 | PCT Int'l Appl. . |
| 8504112 | 9/1985 | PCT Int'l Appl. . |
| 111425 | 10/1977 | Sweden . |

Primary Examiner—Richard V. Fisher
Assistant Examiner—W. Gary Jones
Attorney, Agent, or Firm—William W. Haefliger

[57] ABSTRACT

The present invention provides significant improvements in the design and performance of a specific type of Rotary Membrane Filter (RMF) apparatus which has the capability of separating particles from a fluid having the same and nearly the same density as the particles by utilizing shear to achieve separation, not centrifugal forces. A particular application for the apparatus is in the processing of fluid suspensions in which the suspensions contain fragile particles which are subject to damage due to excessive shear stresses. The prior art describes processing at *constant shear rate*, whereas the present invention provides the design and optimization of operation of such an apparatus at *constant shear stress*, which is maintained at a value below that at which significant damage to the fragile particles is encountered. The use of the invention in plasmapheresis (blood separations) is described in detail, it being understood that the teachings of the invention are also directly applicable to other fluids containing fragile particles.

The application of the RMF in a continuous flow processing system designed to extract blood plasma from a donor is described, including return of corpuscular components to the donor.

16 Claims, 23 Drawing Sheets

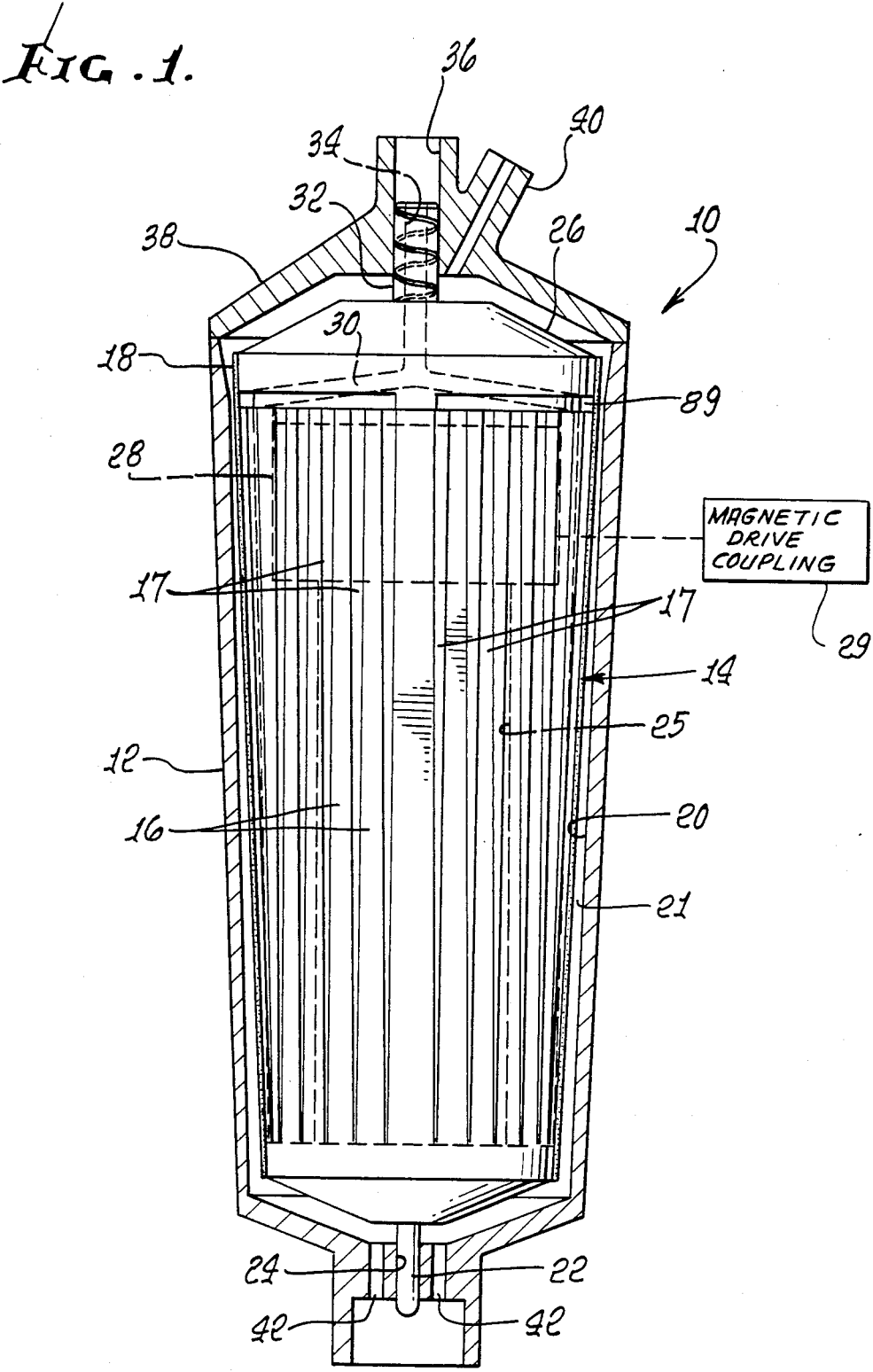

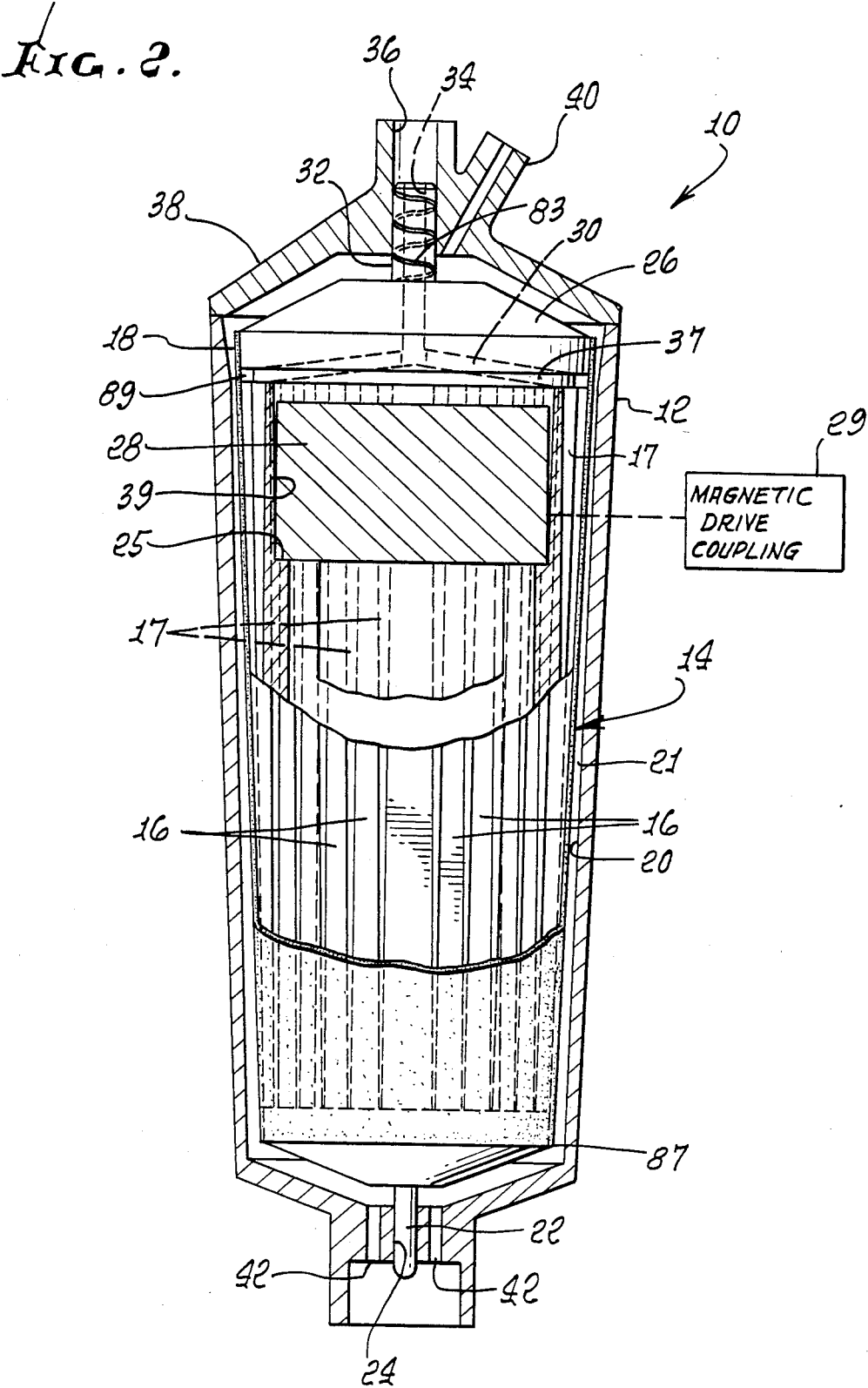

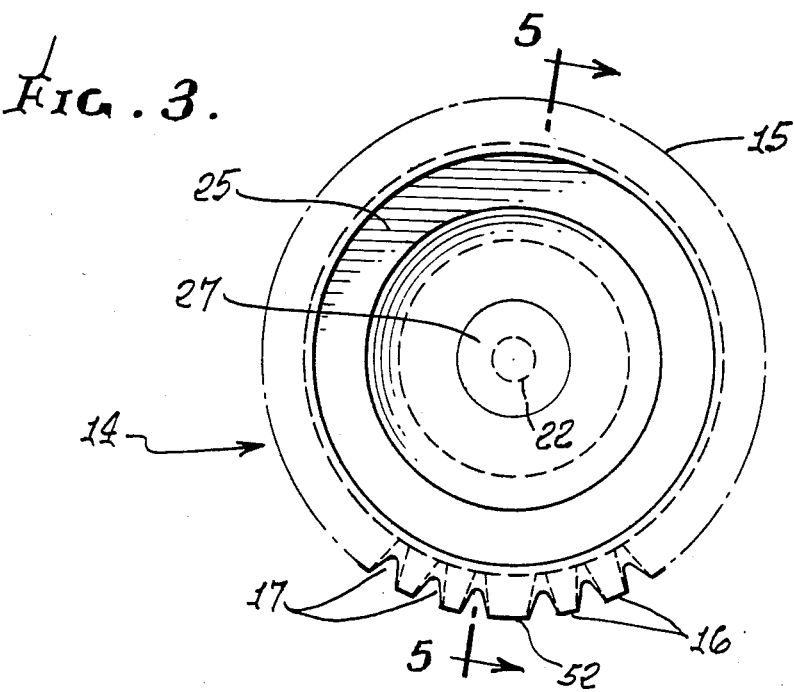
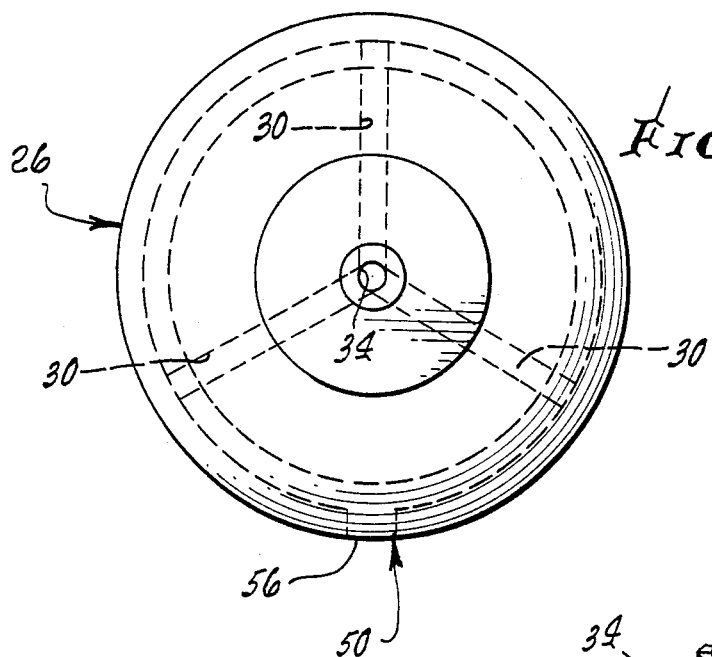
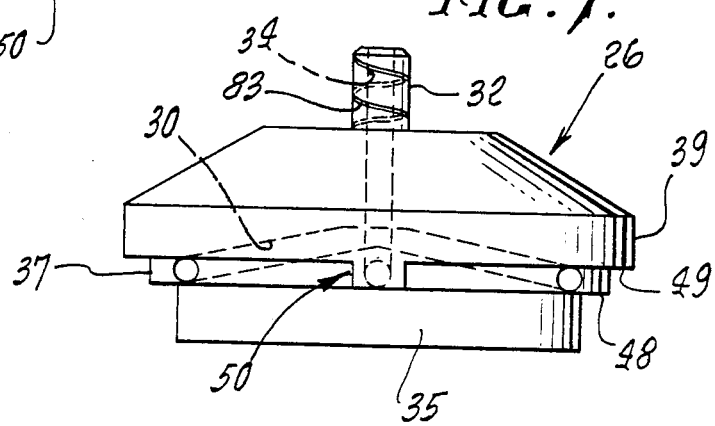

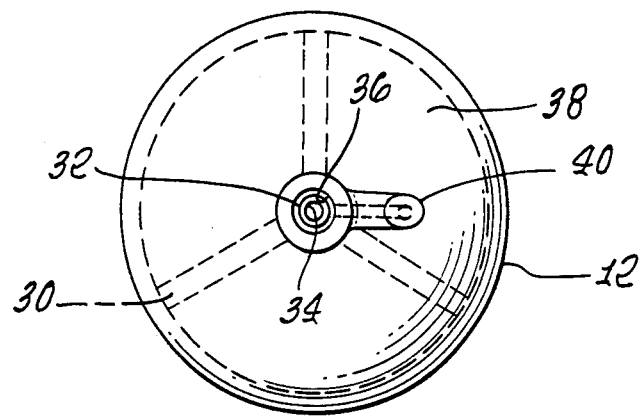
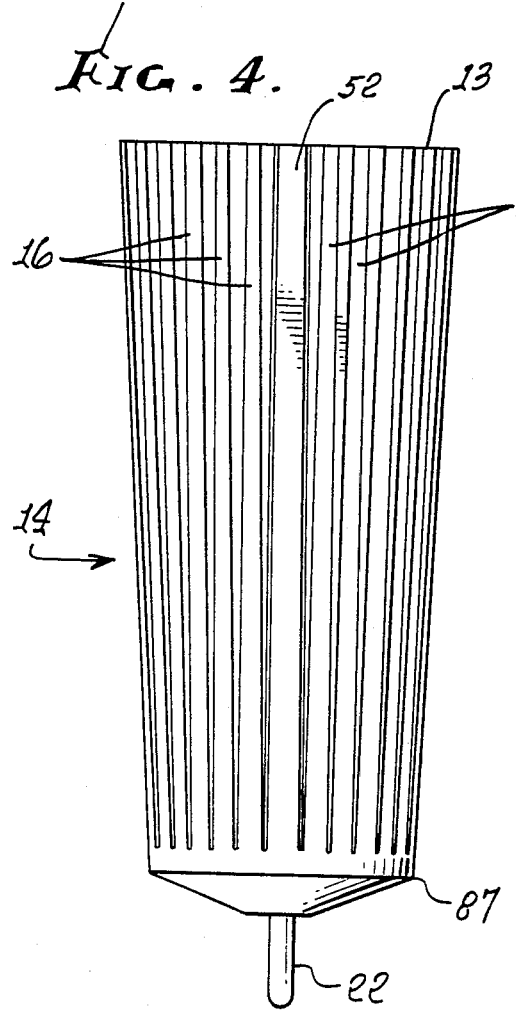
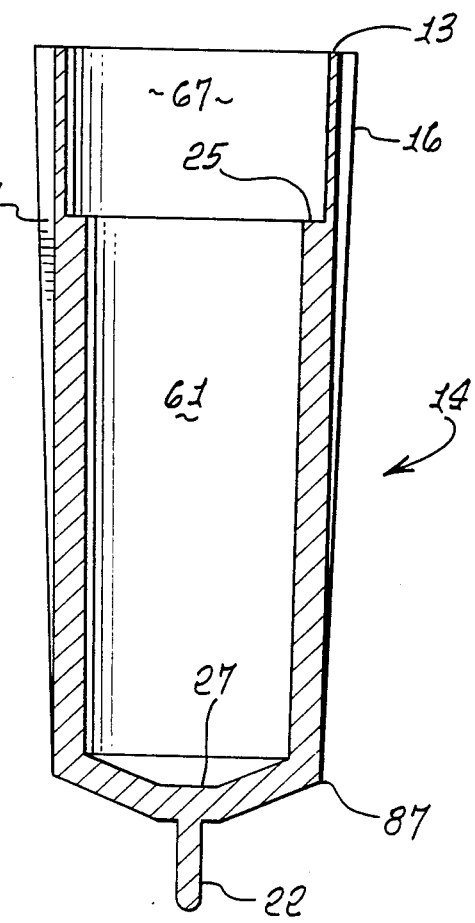

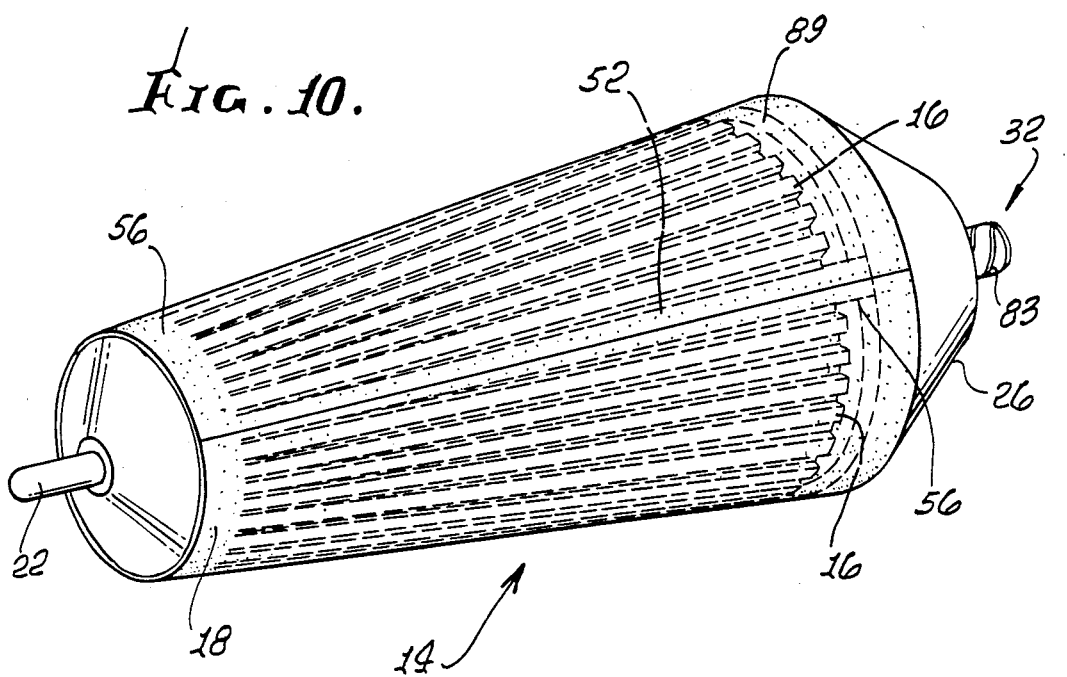
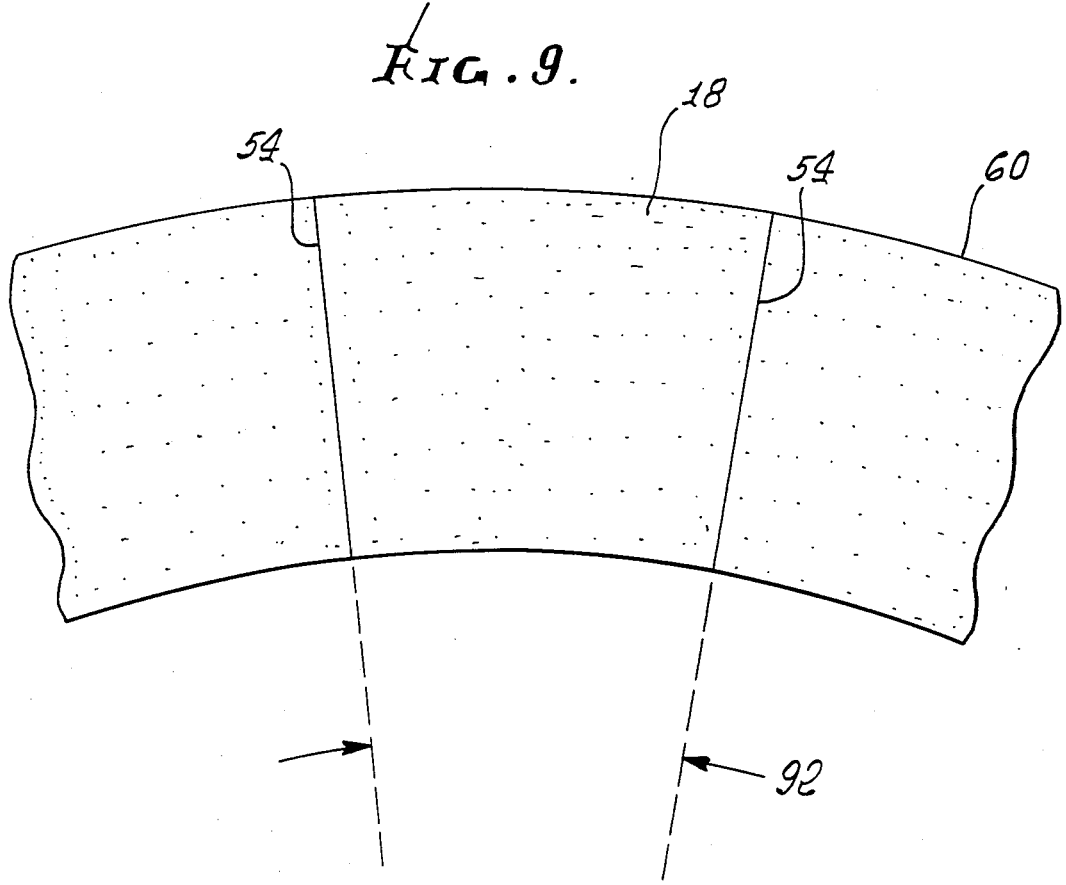

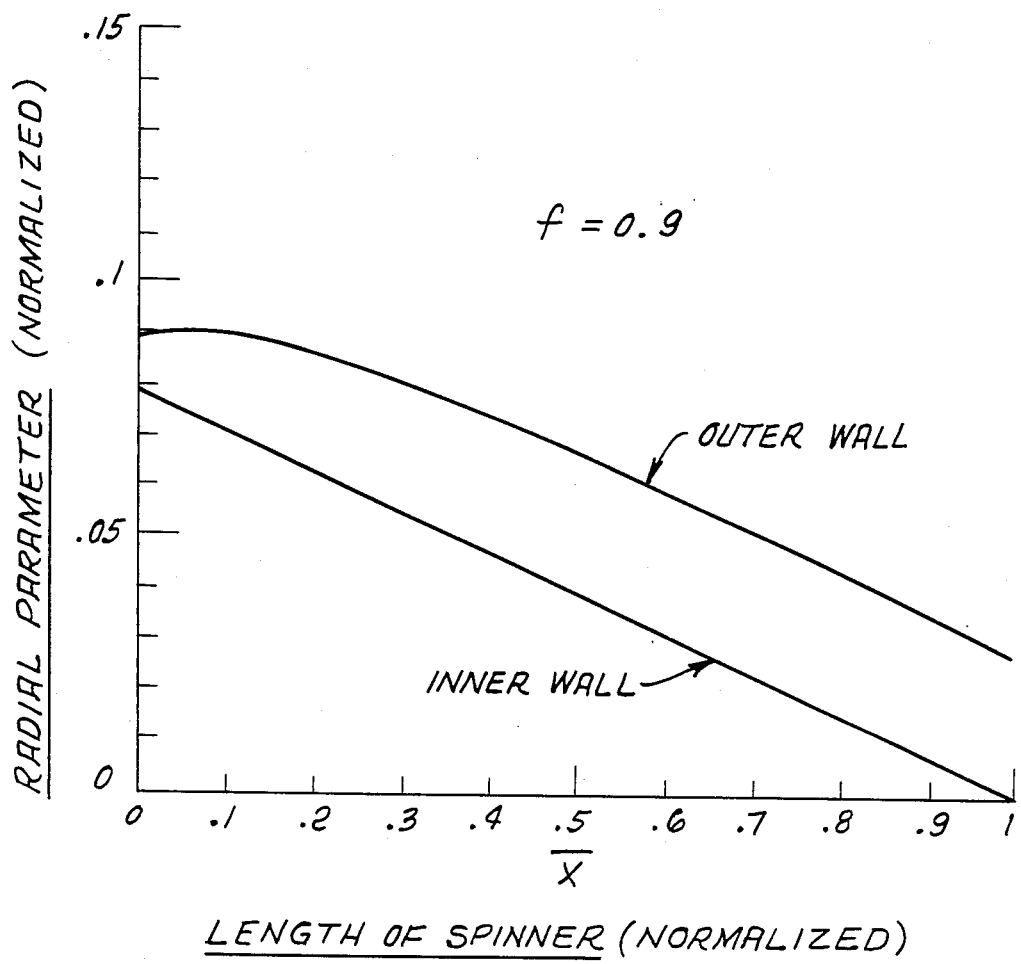

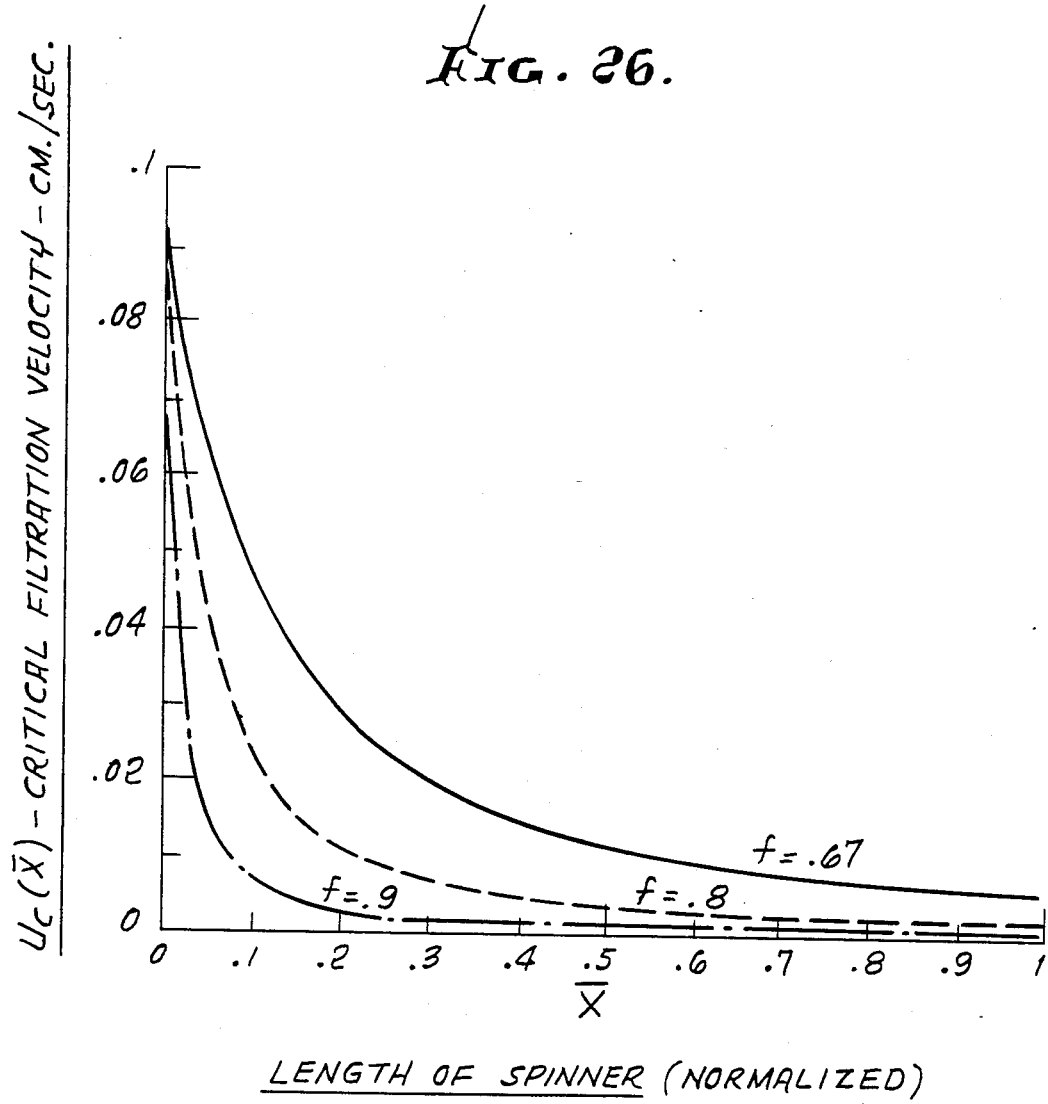

COUETTE MEMBRANE FILTRATION APPARATUS FOR SEPARATING SUSPENDED COMPONENTS IN A FLUID MEDIUM USING HIGH SHEAR

BACKGROUND OF THE INVENTION

The present invention relates to filtration devices, and in particular, couette membrane filtration systems for separating blood plasma from whole blood.

In the filtration and separation of fluid suspensions, devices using centrifugal effects exclusively, shearing effects in combination with membrane filtration and a combination of centrifugal and shearing action have been utilized. Devices utilizing centrifugal forces for achieving separation have been used with suspensions containing sedimenting components. Fluid suspensions, in general, have been filtered by means of membrane filtration devices. A particular type of membrane filtration device, one in which shearing effects are utilized to obtain filtration, is the couette membrane filter. A couette filter is one which is usually characterized by a series of laminar rotating, cylindrical sheets of fluid slipping over one another immediately adjacent a rotating surface. However, a couette filter can also include Taylor vortices without detracting from its ability to filter suspensions so long as the vortices are of laminar character.

In the usual configuration, a couette membrane filtration device utilizes a stationary cylindrical container and a cylindrical insert rotatably disposed within the container. The insert typically includes a semipermeable membrane wrapped around and supported by the insert. The stationary container and insert are dimensioned such that a narrow gap is defined between the inner facing surface of the container and the outer facing surface of the membrane. It is into this gap that the fluid suspension to be filtered is introduced. In this configuration, if the rotation speed is high enough, the laminar flow of cylindrical sheets is replaced by a laminar flow of a slightly different nature, one which is characterized by a regular sequence of counter-rotating toroidal vortices, i.e., Taylor vortices located in the gap. Provided the rotational velocity of the cylindrical insert is maintained below a certain upper limit, the toroidal vortices retain their individually laminar nature and occur as an alternating sequence of counter-rotating toroids which are located in the gap and appear regularly over the entire axial length of the rotatable insert. Such Taylor vortex flow is further characterized by a laminar fluid boundary layer located adjacent the membrane which retains a cylindrical shearing effect for a finite distance extending from the membrane surface radially into the fluid in the gap.

A dimensionless number, analogous to the Reynolds number, has been defined to characterize this flow and is referred to as the Taylor number. The Taylor number is related to the radius and speed of rotation of the insert, the gap thickness, and the viscosity of the fluid suspension. According to the classical definition of laminar flow, Taylor flow, for a Taylor number below known limits, can be considered to be laminar, since the fluid particles follow steady streamlines.

In use, the fluid suspension is introduced into the gap between the facing surfaces and caused to flow along and parallel to the membrane surface. Rotational motion between the insert and container is introduced by spinning the insert within the cylindrical container. The relative rotational motion of the two surfaces creates a rotational shearing action and the Taylor flow referred to above, which flows are superimposed on each other. By providing a sufficiently high shear rate, "... the gel layer of congealed solute, or the concentrated polarization layer of particles adjacent the membrane is swept away," as described by Lopez. The boundary layer is then characterized by a concentration gradient of suspended material that increases from nominally zero concentration at the membrane surface to the actual bulk concentration values of the fluid suspension in the region just beyond the laminar boundary layer.

The creation of an essentially particle-free boundary immediately adjacent to the membrane proceeds from a resolution of opposing forces Hydrodynamic forces, tending to drive particles of any density away from the membrane surface, are due to the fluid shearing action. These forces have the effect of being repulsive relative to either the rotating or stationary surfaces. Filtration drag produces convective forces acting in the opposite direction. Such drag is due to filtrate passing over the suspended particle, which must be left behind, as filtrate passes through the membrane (a particle may be any enclosed viscous discontinuity relative to the suspending medium, e.g., a bubble). Both forces act at right angles to the flow of the fluid suspension. The shearing repulsive force and the convective drag force exerted on the suspended particle are distinct from the pressure forces that drive the suspension along the membrane or the filtrate toward and through the membrane. Where the repulsive shearing force overbalances the convective drag forces, the particle-free boundary layer results. If pressure is now applied to the fluid suspension, a differential pressure, referred to as transmembrane pressure, TMP, exists across the membrane. The transmembrane pressure causes the now-separated fluid in the vicinity of the membrane to flow through the pores of the semipermeable membrane and onto the surface of the insert. The separated (filtered) fluid is then driven by pressure to an outlet from the device where it is collected. The balance of the fluid suspension with its now-increased concentration of suspended material flows within the gap under the influence of pressure and/or gravity to a second outlet of the unit where it is removed.

Such a device can be utilized for the separation of red blood cells from blood plasma in settings such as in blood donor centers. In the typical operation of a plasma donor center, the extraction of blood plasma is the important objective and the plasma is the material which is retained by the center typically for later use as plasma or for further processing to extract certain factors from the plasma. The donor's red blood cells, which are collected at the second outlet from the filtration device, are then reintroduced into the donor's circulation sometimes utilizing an additional saline solution as a suspending medium to provide the necessary fluidity and restore donor blood volume.

A limiting factor in the efficient operation of membrane filtration devices, particularly when used with blood, is the tendency of such filters to experience a phenomenon (polarization) wherein the pores of the semipermeable membrane become plugged with the red blood cells from the blood suspension to the point where the transmembrane flow of plasma is drastically reduced.

One reaction to this phenomenon has been an attempt to increase the pressure exerted on the fluid suspension introduced into the filtration device in an effort to force the plasma through the plugged membrane. Such efforts have been unsuccessful, however, since increases in transmembrane pressure merely cause more red blood cells to plug the pores of the filter increasing the resistance of the coated membrane to the flow of plasma therethrough.

It has been thought that a rotating filter type of device is the indicated solution to such a problem. In the configuration where the interior member is arranged to rotate within the hollow container, the unplugging or unfouling of the filter is sought to be accomplished by a combination of centrifugal action which tends to throw the plugging matter off of the surface of the rotating inner element where it is swept away by the "shearing" action that is created by the combination of the flow of fluid in the gap between the two elements and the relative motion of the two elements to each other.

Such an approach is described in U.S. Pat. No. 3,750,885 which is a strainer device having a rotatable cylindrical screen filter. Particles in the fluid suspension that build up on the screen filter are said to be removed from the outside of the screen by a combination of centrifugal and shear action. The filter apparatus described in the '855 patent provides for rotation of the interior screen section such that a centrifugal type of reverse flow can act together with a "shear" effect to dislodge particles from the screen surface. The centrifugal forces generated on the particles produce an outward radial dislodgement of the collected particles from the screen and removal from the screen. This approach is useful with heavier high density particles, but it has been shown in the scientific literature that centrifugal effects on nearly neutrally buoyant particles, such as red blood cells, are completely masked by shearing effects when the shearing effects are at a level to be useful for filtration.

Use of shearing effects to specifically obtain filtration of blood is described in U.S. Pat. No. 3,705,100 to Blatt. As described therein, the use of shearing effects on blood results in an improvement in the efficiency of the flow of plasma through the membrane. This approach has been used in later channel-type devices where an attempt has been made to achieve large membrane areas having relatively high rates of shear so as to obtain devices which are sufficiently efficient to obtain rates of flow which make the devices suitable for use in clinical settings such as blood donor centers. However, in the case of blood donor centers, the donor's natural blood flow rate is usually too low to achieve sufficiently high rates of shear and large membrane areas simultaneously.

A solution to this problem is provided in U.S. Pat. No. 4,212,742, wherein the concept of recirculation of the blood through the device is introduced. However, with or without recirculation, the viscosity of blood is such that the very high shear rates suggested by Blatt, viz., in excess of 2000 sec.$^{-1}$, cannot be achieved unless high driving pressure is employed as well. Consequently, there exists an unacceptably high TMP and associated polarization described earlier which cannot be mitigated because of the operation of physical principals governing flow under these conditions. This polarization problem is further compounded in that the deposition of red blood cells on the membrane causes severe damage to the cells, making the red blood cells unsuitable for return to the donor.

Others have taken the approach of accepting much lower rates of shear compensated by a very much increased membrane area, it being understood that less shear is accompanied by substantially lower permeate flux rates per unit of membrane area. This approach works better than the high shear method because the additional membrane required bears a non-linear, i.e., power less than one, relationship to the lowering of shear rate and permits the same total permeate flux for the device as a whole to be achieved with less driving pressure. Nevertheless, the membrane areas required in this case are very large and costly, rendering the device prohibitive for some uses such as donor plasma collection or large-scale therapeutic apheresis.

Still another consideration that must be taken into account in the design of either a couette type filter or channel device is the fact that, as such devices are used with blood, and plasma is extracted as the whole blood flows through the device, the extraction of plasma results in an increasing cell concentration, i.e., hematocrit of the remaining concentrated blood. Not only does viscosity increase rapidly with increasing hematocrit, but it can also be seen that the tendency of the exit portion of the filter to become plugged also increases markedly. Both the increase in viscosity and filter plugging contribute to blood cell damage.

SUMMARY OF THE PRESENT INVENTION

The present invention addresses the foregoing problems by providing an apparatus for filtering fluid suspensions wherein the invention comprises an elongated hollow container having an interior wall with a first predetermined tapering profile. An elongated core element is disposed within the container. The envelope of the core element has a second predetermined tapering profile such that a gap having a width which varies in the direction of elongation in a predetermined manner is defined between the exterior wall and the core element. Inlet means are located at one end of the apparatus, and means are provided for introducing a fluid suspension under pressure through the inlet means into the gap. Means are provided for rotating the core element within the container at a predetermined angular velocity, such that shear stress, of a value less than a predetermined maximum limit, is imposed on the fluid suspension, the shear stress being essentially constant over the entire longitudinal extent of the core element due to the geometry and configuration of the gap. Further, the geometry and configuration of the gap is such that the rotation produces laminar flow within the suspension, possibly of a Taylor vortex character. First outlet means are also located at the inlet end of the apparatus for removing fluid extracted from the fluid suspension, and second outlet means are located at the end of the apparatus opposite the inlet end for removing the remaining portion of the fluid suspension. Membrane means are disposed over the exterior surface of the core element and/or over the interior surface of the container for filtering and separating the fluid from the fluid suspension when the core element is rotated, and means are provided for communicating the filtered fluid from the side of the membrane opposite the fluid suspension to the first outlet means.

In use, a fluid suspension such as whole blood obtained from a plasma donor is pumped into the apparatus. The fluid suspension flows under pressure into the gap between the hollow container and the core element and fills the entire generally annular space (gap) from the inlet to the outlet end of the apparatus. The concentric core element is rotated at a selected angular velocity for the gap dimension being utilized, which produces a Taylor number for the apparatus corresponding to the laminar flow of the fluid suspension and below the Taylor number at which random turbulence is produced.

The shearing action produces a laminar boundary layer immediately adjacent the membrane that consists essentially of the suspending fluid (plasma) only. The suspended material (red blood cells) is repelled toward the center of the gap and, as a result, the plasma is induced, under the influence of the pressure exerted on the fluid suspension, to flow through the pores of the membrane and onto the surface of the core element and/or interior wall of the containment vessel. The flow of plasma through pores in the membrane takes place over the entire surface of the membrane, and it can be seen that, as the whole blood moves through the apparatus from inlet to outlet, the amount of plasma present is diminishing and therefore the hematocrit increases as does the viscosity of the remaining whole blood on the upstream side of the membrane.

In qualitative terms, the radius of the rotating core element varies with the radius of the interior wall so that the gap thickness increases in a predetermined manner from blood inlet (normally located at the top of the device oriented with its spin axis vertical) to blood outlet at the bottom of the filtration unit to accommodate the increasing hematocrit and viscosity. In general, the gap is smaller near the top (or blood inlet) and wider at the bottom near the outlet for the red blood cells and, in one specific embodiment, the profile of the interior wall of the container and the exterior membrane surface of the rotating element are sections of inverted truncated cones. The specific dimensions of the gap at each interval along its longitudinal extent is chosen so as to maintain a constant shear stress on the fluid suspension that is located in the gap, even as that fluid suspension changes its viscosity along the longitudinal extent.

It has been shown in the scientific literature that red blood cell damage respecting the flow of blood in the vicinity of foreign surfaces is uniquely related to shear stress. Above a certain limit of shear stress, serious damage to the red blood cells occurs. Below that limit, virtually no damage is encountered. In the present invention, other sources of hemolysis are minimal.

Particularly applicable to the present invention is the work of Nevaril who studied hemolysis at very high rates of shear in a couette viscometer, essentially equivalent to the couette membrane filter for purposes of the question at hand. Nevaril discovered that, below a shear stress value of 1500 dynes/$cm^2$, hemolysis, either immediate or latent, was too low to be detected in his apparatus. Between shear stress values of 1500 and 3000 dynes/$cm^2$, there began to occur a rapidly increasing rate of morphological change in the RBC which resulted in removal of these damaged RBC from the circulation within 24 hours of reinfusion into the donor. This is indicative of latent cell damage and may be considered to be equivalent to outright cell destruction for clinical purposes. Above 3000 dynes/$cm^2$, cell destruction was immediate and complete. Clearly, for purposes of device design regarding the present invention, 1500 dynes/$cm^2$ should be taken as a safe upper limit.

It is the essence of the present invention that this particular structure and this particular geometry results in a constant shear stress on the fluid of a value just below the limit at which RBC damage occurs and that this geometry and structure compensates for the change in viscosity due to changing hematocrit as plasma is withdrawn resulting in highly efficient plasma collection, while minimizing damage to the red blood cells of the donor which are normally reinfused into the donor after the plasma extraction has been accomplished.

The solution provided by the present invention proceeds from the work of Lopez as described in *Ultrafiltration in Rotary Annular Flow* (Ph.D. Dissertation, University of Lund, Sweden, 1979) and in "Ultrafiltration at Low Degrees of Concentration Polarization: Technical Possibilities," *Desalination*, Vol. 35, pp. 115-128, 1980, and in his Swedish Pat. No. 7711142-5 dated Oct. 5, 1977, where he describes the use of a couette membrane filter capable of producing arbitrary rates of shear without regard to flow rate or resistance through the device which is the problem that plagues channel type devices. Lopez demonstrated that shear in a couette membrane filtration device is achieved independently of the flow rate through the device.

Adapting the Lopez teaching to the filtration of blood in the present invention results in the provision of a couette membrane filtration device utilizing a stationary outer wall and a rotating inner membrane. Because centrifugal forces are ineffectual in a couette membrane filtration device used with blood, an equivalent configuration not disclosed by Lopez or found in the prior art places the membrane on the interior surface of the containment vessel. In either case, the present invention prefers rotation of the inner surface to produce the shearing action. The use of a rotating inner surface, whether or not that surface carries a membrane, adds an additional practical advantage in that it means that the inlets and outlets from the device can be located in the stationary outer container, thereby eliminating external rotating seals. Such external seals, when required, result in a myriad of problems, including susceptibility to septic contamination and leakage.

The operating parameters include operation of the device with a selected shear rate that will prevent polarization (plugging) of the membrane for the amount of plasma to be obtained in each cycle of operation, while still achieving the filtration efficiency required. Greatest efficiency results from devices using the narrowest possible gaps and lowest speeds of rotation that still achieve the desired shear rate. By keeping the gap small, thus resulting in low total blood volume in the device at any given interval, the residence time of blood in the device is minimized. This factor, combined with operation at a shear rate which avoids polarization of the membrane, minimizes damage to the red blood cells, i.e., prevents or minimizes hemolysis, bearing in mind that the maximum usable shear rate at any point within the gap is limited by the shear stress limit as described above.

In the presently preferred embodiment, the filtration unit according to the present invention consists of a hollow container having the configuration of a generally tapering surface of revolution and a membrane-covered core element or spinner having a configuration that generally follows the configuration of the hollow container. A solid mounting pin is integrally molded into one end of the spinner and longitudinally extending channels are molded into the exterior surface of the spinner. A spinner cap is mounted at the end of the spinner, and a hollow pin disposed about the axis of the cap is integrally molded with the cap. The general profile of the inner facing wall of the container and the outer facing surface of the spinner are that of elongated inverted truncated cones. The spinner is dimensioned so as to provide a small annular gap between the inner and outer facing walls. In general, the filtration unit is oriented with is spin axis vertical and first inlet means at the top. In this orientation, the dimension of the gap increases from top to bottom of the unit. The hollow pin molded into the top of the spinner cap communicates with the interior of the filtration apparatus of the present invention. An end cap having a hollow passage in the top thereof for receiving the hollow pin on the spinner cap in a radial bearing relationship is mounted on top of the assembly and is secured to the periphery of the hollow container. A portion of the exterior surface of the hollow pin also serves as a sealing surface more specifically described, hereinafter. All parts of the filtration device are adapted to be injection-molded from materials such as polycarbonate and, in keeping with present practice, the entire unit is intended to be disposable after use with one specific donor.

An inlet port enters through the top of the end cap and is located at an angle to the hollow pin. The inlet port is directed at the spin axis of the hollow pin so that blood entering the unit can flow into the top of the unit against the spinning hollow pin and along the pin onto the top of the spinner cap and thence into the gap.

This configuration causes blood to flow into the unit symmetrically against the slowest velocity surface with minimum trauma and no stagnation points. The admitted whole blood proceeds over the top of the end cap and down the sides of the inner wall of the container through the gap. As discussed above, in the transit of the whole blood through the gap, plasma is separated from the whole blood in a laminar boundary layer adjacent the membrane due to the shearing action produced by the rotating spinner and, under the influence of transmembrane pressure, passes through the pores of the semi-permeable membrane into the channels where it flows up through the channels into the spinner cap manifold and thence through the hollow pin to an outlet at the top of the unit. The remaining concentrated red blood cells pass through to the bottom of the unit and outwardly through exit ports.

Rotational drive for the spinner unit is accomplished by magnetic coupling between a drive source located externally of the apparatus and a magnet mounted in the interior of the spinner unit.

In the presently preferred embodiment, the magnet in the spinner unit is a piece of radially oriented four-pole ceramic magnet. The spinner and magnet combination then serves as an armature which is magnetically coupled to magnets disposed in a holder which positions four corresponding radial magnetic poles around the exterior of the container. A synchronous motor can be used to drive the holder, and the magnetic coupling with the interior magnet produces rotation of the spinner at the desired angular velocity.

Since the spinner is hollow and is designed so that it is light in weight, it is neutrally buoyant or nearly so in whole blood and floats in the whole blood which is supplied to the unit. The light weight and floatation of the spinner unit reduces the criticality of the magnetic coupling. A further advantage is derived in that, with the magnet encased within the spinner unit, it is totally sealed from the blood and plasma and no possibility of contamination exists from this direction.

A shallow spiral groove is imparted to the exterior surface of the hollow pin. The direction of the spiral groove is chosen so that a slight pumping action, opposite to the direction of plasma outflow, is established. For example, when the magnetic coupling to the unit is arranged so as to drive the spinner in a right-hand direction, a right-handed spiral groove is imparted to the pin. If rotation is left-handed, a left-handed spiral groove is used. The spiral groove is designated so as to have the effect of exerting a slight pumping action which causes a small amount of plasma exiting from the outlet port to be pumped back into the unit and to exert a small pressure on whole blood admitted to the interior of the filtration unit, greatly enhancing the effectiveness of the seal around the hollow pin and preventing whole blood, i.e., red blood cells, from leaking through the top of the unit into the filtered plasma.

The configuration of the present unit also means that plasma is removed from the top of the unit and thus keeps the seal at the plasma outlet at a point which is remote from the heaviest concentration of red blood cells.

DESCRIPTION OF THE DRAWINGS

These and other aspects of the present invention will be better understood by reference to the drawings, wherein:

FIG. 1 is a sectional view in elevation of a filtration separation apparatus according to the present invention.

FIG. 2 is a sectional view in elevation, partially broken away, of the apparatus of FIG. 1.

FIG. 3 is a top plan view of a spinner element used in the apparatus.

FIG. 4 is an elevation view of the spinner element.

FIG. 5 is a sectional view of the spinner element taken along lines 5—5 of FIG. 3.

FIG. 6 is a top plan view of a cap for the spinner element including a manifold.

FIG. 7 is an elevation view of the spinner cap.

FIG. 8 is a top plan view of the assembled filtration apparatus according to the present invention.

FIG. 9 is a plan view of an annular piece of membrane material showing a section thereof ready for attachment to the spinner element.

FIG. 10 is a perspective view of the spinner element and cap with a semi-permeable membrane secured to the exterior surface.

FIGS. 24A and 24B are graphs similar to FIGS. 22A and 22B for the conical spinner configuration.

FIG. 26 is a graph depicting the critical filtration velocity as a function of normalized length for several values of plasma extraction fraction.

DETAILED DESCRIPTION OF THE INVENTION

Figure 11:
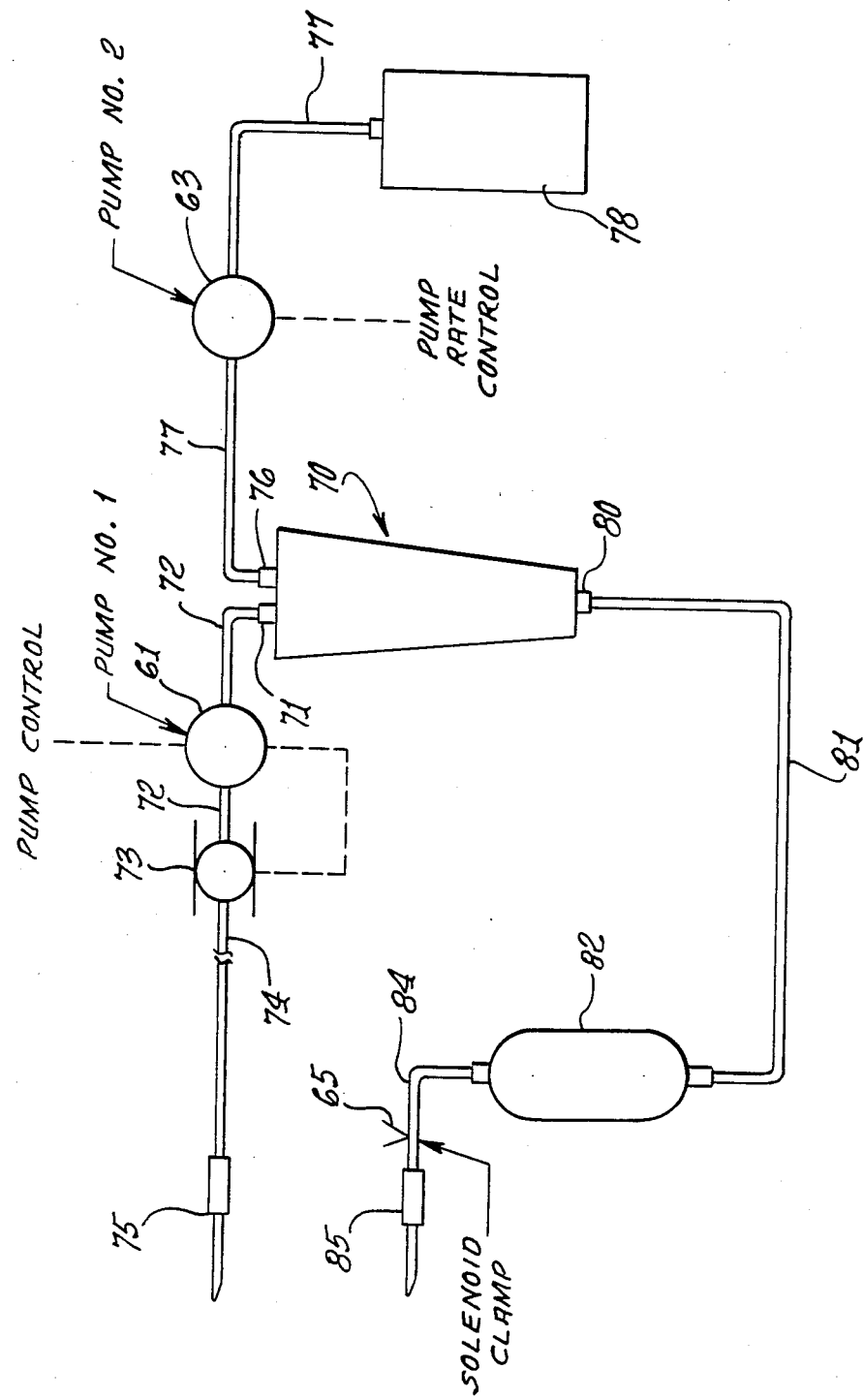
FIG. 11 is a schematic diagram of a plasmapheresis system using a membrane filtration apparatus according to the present invention.

A membrane filtration apparatus 10 according to the present invention is shown in FIG. 1. This apparatus is specifically intended for use in separating plasma from whole blood, for collecting the plasma and concentrated red blood cells after the separation has been accomplished, and for returning red blood cells to the donor after the plasma collection has been completed. As shown therein, the apparatus consists of a stationery elongated containment vessel 12 and an elongated rotatable spinner 14 disposed within vessel 12. The interior wall of vessel 12 has a tapering profile from top to bottom, and spinner 14 likewise has a tapering configuration which generally follows the interior taper of the vessel. As seen in FIGS. 1 and 2, the outer surface of spinner 14 is invested with a plurality of longitudinal channels 17 in the exterior surface of the spinner forming ribs 16 therebetween.

A porous semipermeable membrane 18 extends around and overlies the exterior surface of the spinner 14. The interior wall 20 of the containment vessel 12 is slightly concave inward in longitudinal profile giving said interior wall 20 an inverted approximately conical axial cross-section such that the spacing of inwardly facing wall 20 along its entire longitudinal extent from the straight outer surfaces as seen in longitudinal axial section, of the longitudinal ribs is maintained at a distance determined according to the principles of the present invention so as to define a narrow gap 21 between the interior wall of the vessel and the semipermeable membrane which is wrapped around the spinner member. The thickness of the gap varies in the longitudinal direction and is maintained at a width at each point such that the shear stress to which the blood is subjected during the plasma extraction interval is maintained at an essentially constant value less than 1500 dynes/cm$^2$ over the entire length of the membrane surface in spite of the large increase in blood viscosity as the blood transits the length of the apparatus. Spinner 14 is rotatably mounted by means of pin 22 extending through aperture 24, which is molded into the base of the containment vessel.

A spinner cap 26 is located at the top of spinner 14 and is force-fitted and secured in an opening at the top of a cavity 39 in the interior of spinner 14. A four radial pole ceramic disk magnet 28 is mounted in cavity 39 below cap 26. Magnet 28 is bonded to the interior wall of the spinner. By means of a drive mechanism 29 magnetically coupled to magnet 28, spinner 14 is caused to rotate on its axis of rotation when the plasma separation apparatus 10 according to the present invention is operated. A series of conduits 30 functioning as a manifold extend from the recessed perimeter 37 of spinner cap 26 to its axis. The recessed perimeter 37 of spinner cap 26 forms a circumferential collection channel 89 at the ends of the channels 17 in spinner 14.

Conduits 30 communicate with and extend from the circumferential collection channel 89 formed between spinner 14 and cap 26 to an upwardly directed passage 34 in hollow pin 32, which, in the presently preferred embodiment, is integrally molded with cap 26. Containment vessel 12 is sealed by means of a cap 38 which defines an inlet port 40 where whole blood is introduced into the apparatus and an elongated, hollow conduit 36 which provides a radial bearing surface for pin 32 which is adapted to be slidably fitted therein. Conduit 36 is a first outlet port from the apparatus of the present invention for plasma extracted from blood admitted to the apparatus. Outlet ports 42 at the bottom of the unit serve as second outlet ports for removal of the concentrated red blood cells remaining after the plasma has been filtered out.

Inlet port 40 is also located in the top of cap 38 disposed at an angle with respect to the axis of the apparatus and is directed at the centerline of the upwardly directed hollow pin 32. Blood entering the apparatus flowing into port 40 and against and along pin 32. Port 40 is utilized both as an inlet for the introduction of fluid suspensions such as whole blood into the device and an outlet for concentrated red blood cells suspended in remaining plasma and possibly additional isotonic saline solution when the device is operated with flow reversed.

The spinner element is shown in further detail in FIGS. 2, 3, and 4. FIG. 3 is a top plan view of the spinner element 14 showing its exterior surface 15, into which ribs 16 and channels 17 are molded. The narrowing taper of the channels 17 from the top to the bottom of the spinner element can be seen in each of these figures. The depths of these channels also diminishes over the longitudinal extent of the spinner element from top to bottom thereof. One rib 52 is wider than the rest of the ribs 16 on the exterior surface of the spinner, and provides a land or base to which the membrane is secured as will be discussed in more detail in conjunction with FIG. 9.

As can be seen in FIGS. 2 and 5, the interior of the spinner element is hollow and has a stepped configuration which provides a shoulder 25 located in cavity 67 of the hollow spinner element. Shoulder 25 provides a shelf on which ceramic magnet 28 is seated. The bottom 27 of the interior of the spinner element is spaced approximately twice as far from shoulder 25 as the top surface 13 of the spinner element. Mounting pin 22 provides the axis about which the spinner element rotates.

As shown in FIG. 1, pin 22 is molded as an integral part of the spinner element. The exterior surface at the bottom of the spinner element is generally trapezoidal in axial cross-section, as is best seen in FIG. 5. The perimeter of the bottom exterior surface of the spinner element is shown at 87 in FIGS. 2, 4, and 5. The exterior surface of the bottom of the spinner element corresponds to the contour of the interior surface of the bottom of container vessel 12.

The cap for spinner element 14 is shown in plan view in FIG. 8 and in elevation view in FIG. 7. The cap comprises a plug portion 35 at its base having a first diameter, an intermediate circular portion 37 defining a shoulder 48 and a top portion 39 having a diameter greater than the diameter of intermediate portion 37 and defining a second shoulder 49. As shown therein, three ports 30 extend from the perimeter of intermediate portion 37 into the center interior of element 14, as best seen in FIG. 6. Ports 30 communicate with passage 34 in hollow pin 32. As shown in FIG. 7, a shallow spiral groove 83 is imparted to the exterior surface of pin 32. Spinner 14 is arranged to rotate in a left-hand direction, groove 83 is left-handed, as shown. The groove exerts a pumping action on plasma emerging from passage 34. A minute amount of plasma is carried by groove 83 along the interior of sleeve 36 into the space above cap 26, thereby exerting a slight amount of pressure on the blood in said space, preventing its migration upwardly along the interior of sleeve 36.

When the unit is assembled, spinner cap 26 is mounted on top of spinner element 14. Plug 35 is adapted to fit tightly within the opening at the top of spinner element 14 with shoulder 48 seated on top surface 13. Ports 30 are molded at an angle through intermediate portion 37 and communicate with conduit 34 in pin 32.

The end cap 38 for the filtration unit according to the present invention is shown in plan view in FIG. 6. A hollow sleeve 36 is formed in the top of the cap for receiving hollow pin 32. When the unit is in operation, plasma passes through the pores of the membrane and flows upwardly along channels 17 to top surface 13 where it is collected in channel 89 flowing further into ports 30 and further upwardly to conduit 34. The plasma then flows through conduit 36 into tubing (not shown) which is connected to the outlet port.

The perspective view shown in FIG. 10 shows the manner in which a semi-permeable membrane 18 is mounted on spinner 14. Membrane 18 is cut to size and wrapped around the exterior surface of spinner element 14 so that the ends 54 of the membrane are brought together in abutment and in position so as to overlie rib 52. The portions of the membrane which overlie the exterior surface of rib 52 are bonded to that surface. The remainder of the ribs 16 serve as a support structure for the membrane. In addition, spinner cap 26 is seated on top of the spinner element so that a shoulder 50 extending downwardly from surface 48 of cap 26 mates with and abuts with the top of rib 52. Membrane 18 is of an overall longitudinal length so that when secured to the spinner element, a first end of the membrane completely overlies channel 89 between cap 26 and spinner 14 and is also bonded to the exterior surface 56 of shoulder 50 and the exterior surface of top portion 39. Membrane 18 overlies the entire longitudinal surface of spinner 14 extending below the ends of the longitudinally extending ribs 16 and channels 17 and terminating at circular edge 87 adjacent the base of the spinner. When spinner element 14 is rotated, plasma separated from the blood flowing downwardly in the gap 21 passes through the pores of the membrane and then flows interiorly of the membrane upwardly in channels 17 into channel or header space 89 beneath surface 49 around the periphery of cap 26 to conduits 30 of the manifold.

In one embodiment, membrane 18 is obtained by cutting a sector out of an annular piece of flat membrane material, as is shown in FIG. 9. In FIG. 9, an annulus 60 of membrane material is depicted. Because the profile of the spinner element 14 is that of a truncated cone, a suitable piece of membrane material can be prepared by cutting a sector from the annulus along radii defining a predetermined angle 92 at the center of the annulus and then wrapping this piece of membrane around the spinner element. In the presently preferred embodiment of the invention, this is the procedure used to obtain membrane sheet 18. It is also possible to provide the membrane by casting membrane material on a suitably shaped mandrel and thereafter removing it and placing it on the spinner or casting the membrane directly on a suitably prepared spinner surface. There are a wide variety of commercially available sheet membranes in a plurality of materials and porosities. A particular material having a particular porosity is selected for its suitability with respect to the specific fluid suspension which is to be filtered by the apparatus.

In the case of whole blood, a material such as polycarbonate membrane material having 0.6 micron pores and a thickness of 10 microns is utilized in the presently preferred embodiment of the invention.

Figure 12:
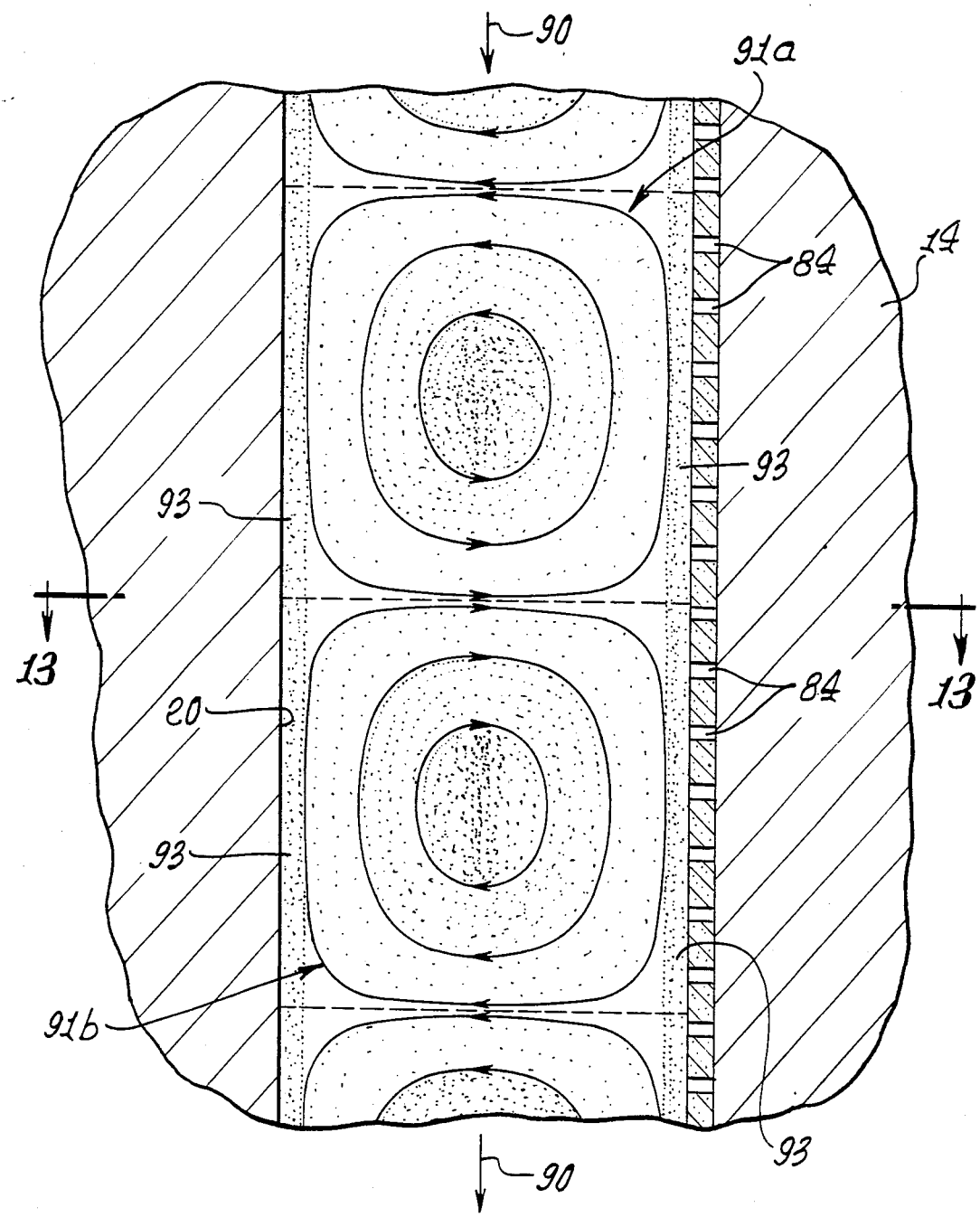
FIG. 12 is an enlarged vertical sectional view of a portion of the filtration separation apparatus according to the invention showing the axial flow of the fluid suspension in the gap and the Taylor vortices which are formed.
Figure 13:
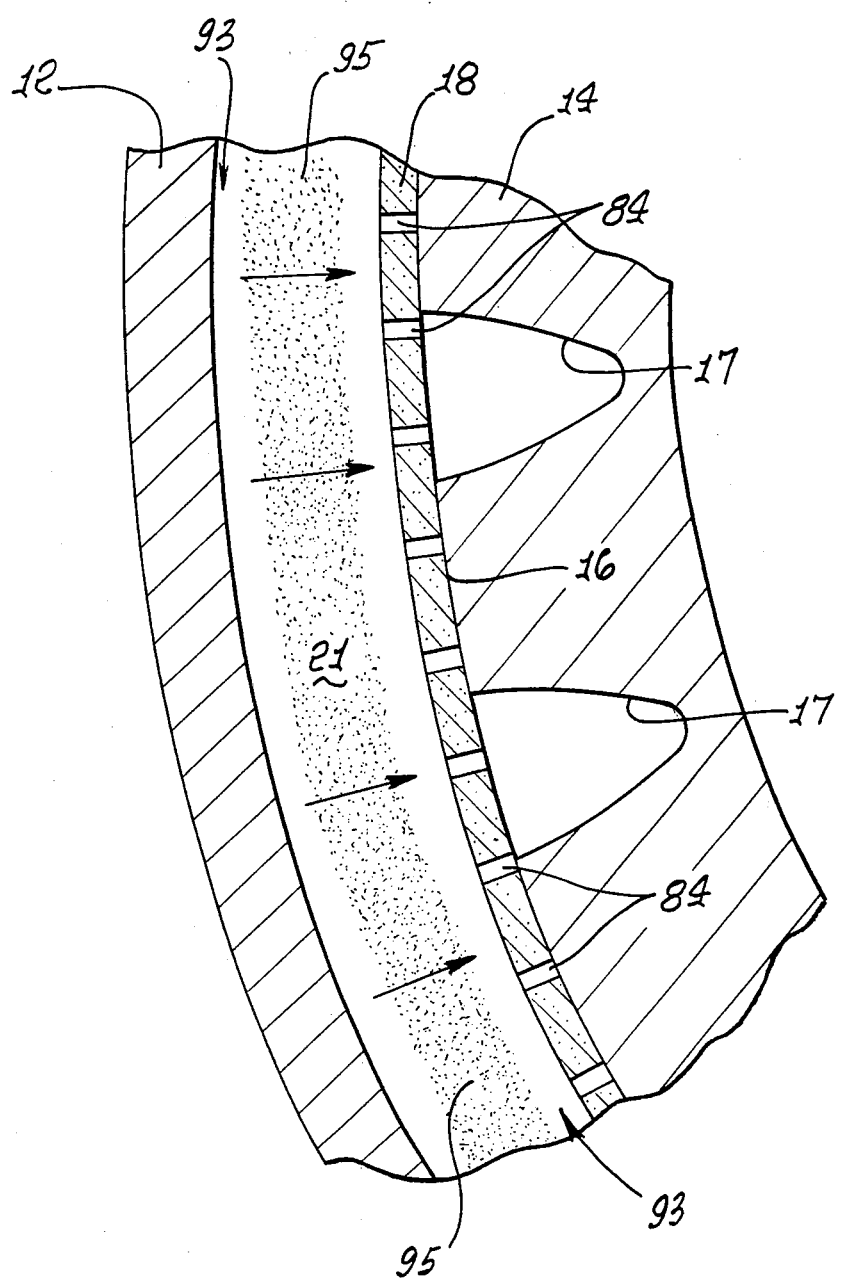
FIG. 13 is a view taken along lines 13—13 of FIG. 12 showing the boundary layer regions adjacent the facing surfaces of the filtration separation apparatus and the gradation of suspension concentration.

The enlarged fragmentary views in FIGS. 12 and 13 illustrate the nature of the flow patterns of the fluid suspension as it proceeds axially along the gap of the filtration apparatus according to the present invention. In FIG. 12, a longitudinal section of the apparatus, the axial flow 90 of the bulk fluid suspension, is shown in gap 21. Membrane 18 is shown disposed on spinner element 14 facing the interior wall 20 of the containment vessel 12. A series of alternating Taylor vortices 91a, 91b are formed in the gap as spinner element 14 is rotated at its predetermined angular velocity. As indicated above, the Taylor vortices are in the form of a series of toroids around the spinner extending axially through the apparatus and the view of the vortices shown in FIG. 12 is a section through four such toroids. These toroidal vortices are also laminar in character and rotate at right angles to the direction of rotation of the spinner. A laminar boundary layer 93 is formed between the vortices and the facing surfaces of the spinner element and interior wall of the vessel which, due to the combination of laminar shearing actions, is essentially cell-free immediately adjacent the surface of the membrane. Thus, in operation, there are three flows operating simultaneously on the fluid suspension: the basic shearing action of the spinning membrane, the Taylor vortex flow, and the axial flow of the suspension through the apparatus.

In FIG. 13, a plan view taken along lines 13—13 of FIG. 12 (a section taken between Taylor vortices), the cell concentration gradient 95 can be seen in gap 21, as well as the cell-free boundary layers 93. The ribs 16 and channels 17 on the surface of spinner element 14 are seen in FIG. 13 and support membrane 18. Where the present apparatus is used to filter plasma from whole blood, plasma first flows through the pores 84 of membrane 18 into channels 17 under the influence of the transmembrane pressure and then proceeds axially through channels 17 to the collection point.

Figure 14:
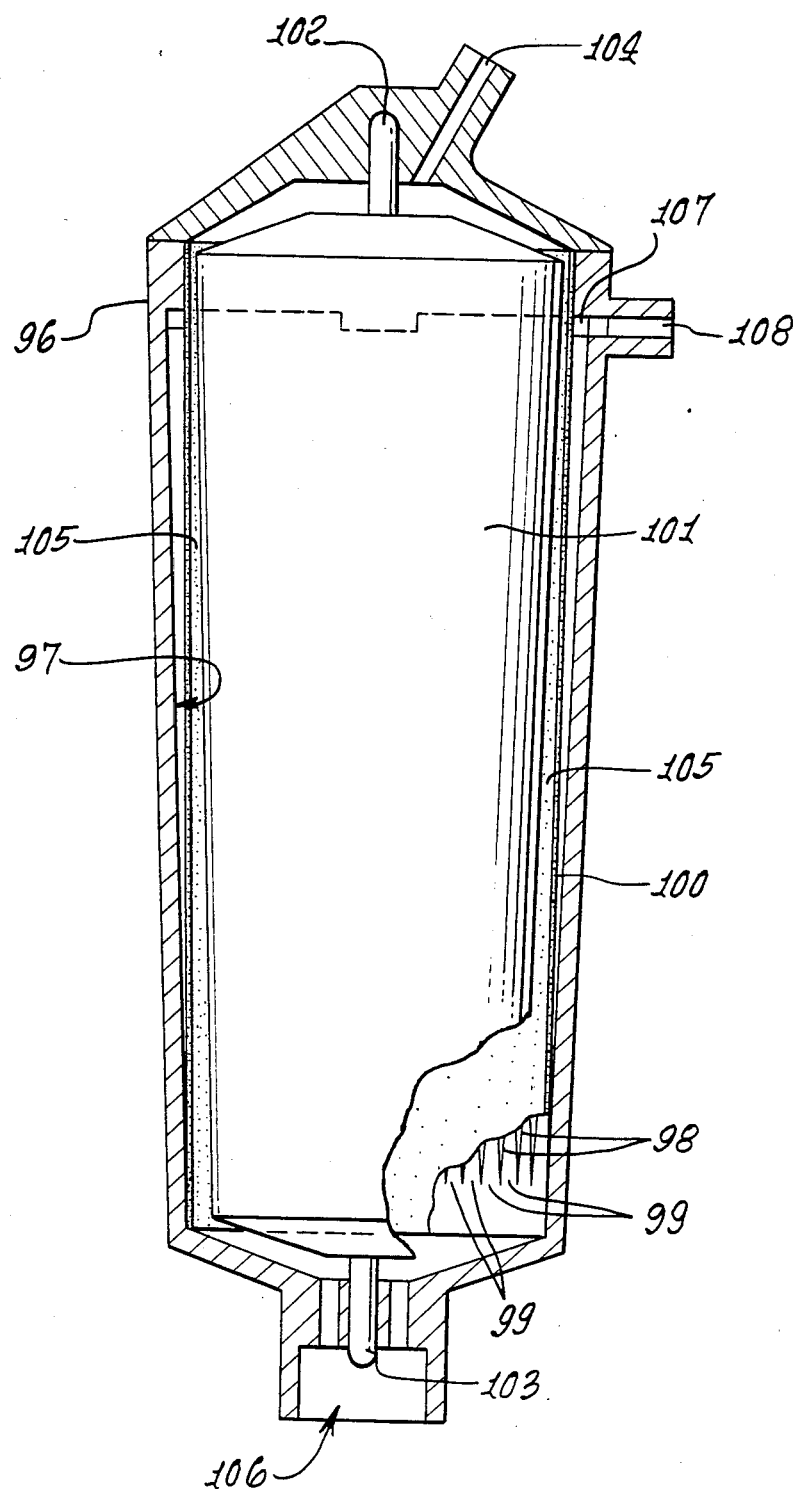
FIG. 14 is a sectional view in elevation of an alternate embodiment of the apparatus according to the present invention.

An alternative embodiment of the filtration separation apparatus according to the present invention is shown in FIG. 14. Here the membrane is attached to the interior wall of the containment vessel and the spinner element is provided with a smooth surface.

In this embodiment the apparatus comprises a containment vessel 96 having a specially configured interiorly facing surface 97. Surface 97 has a plurality of channels 98 molded into it which define a plurality of ribs 99 extending around the inner circumference of the containment vessel. A semipermeable membrane 100 is bonded to or cast upon ribs 99 to provide the filtration medium for the apparatus.

A spinner element 101 is rotatably mounted by means of mounting pins 102, 103 at opposite ends of the interior of vessel 96 and is provided with a smooth uncovered surface. A fluid suspension such as whole blood is introduced into the apparatus through inlet port 104 and flows downwardly through gap 105 between spinner element 101 and membrane 100 toward outlet 106. As before, the gap is maintained in the configuration that it is at its narrowest or minimum dimension at the point where the incoming blood enters gap 105 and increases in width in the axial direction toward the outlet to its widest dimension at the base of membrane 100. As the whole blood moves axially through the apparatus, the spinner is rotated at a predetermined angular velocity such that shear stress is maintained below a predetermined maximum. Plasma is separated from the whole blood in the shear flow and passes under the influence of the transmembrane pressure through the pores of membrane 100 into channels 98 and thence upwardly to collection channel 107 and finally to fluid outlet port 108. Thus, in this embodiment, the membrane is mounted on the stationary surface as opposed to the rotating surface in the embodiment of FIG. 1. The present invention also includes a configuration in which a membrane is mounted on both the rotating and stationary surfaces. In this embodiment, collection channels for the fluid passing through the membranes are provided for each membrane covered surface.

A block diagram shown in FIG. 11 illustrates a type of plasmapheresis system in which the filtration unit according to the present invention is utilized. It should be understood that the diagram is schematic and illustrative only and not specifically indicative of the manner in which the filtration apparatus of the present invention is used. As shown therein, a filtration unit 70 according to the present invention, has its inlet port 71 connected to a first pump means 61 by means of a length of tubing 72 which also connects pump 61 to a suction control 73 and by another length of tubing 74 to a hypodermic needle 75. The hypodermic needle 75 is utilized to connect the system to the plasma donor. A first outlet port 76 is connected to a second pump 63 by means of tubing 77 which also connects pump 63 to a plasma collection bottle 78. A second outlet port 80 at the bottom of unit 70 is connected by means of tubing 81 to a red blood cell collection bag 82. Bag 82 has an outlet port 83 which is, in turn, connected by tubing 84 through a solenoid clamp 65 to a cannula 85 which is adapted to be connected to a supply of anti-coagulant or saline (not shown).

In the plasma-collection phase, air is first cleared from the system by means of reverse pumping of anti-coagulant from cannula 85 to hypodermic needle 75 by means of peristaltic roller pump 61, after first opening solenoid clamp 65 to admit a predetermined amount of anticoagulant or saline to bag 82. Rotation of the filtration unit 70 is then started, the hypodermic needle 75 is connected to the donor, the system is primed with blood across suction control 73, which is provided to protect the donor from excessive suction, and blood is pumped into unit 70. When unit 70 is filled with blood from the donor, a second pump 63 is turned on to withdraw plasma from outlet port 76. In the usual case, five to six hundred milliliters of whole blood are withdrawn from the donor, and the filtration unit separates the whole blood admitted into the unit into plasma which is conducted out of the port 76 to the plasma-collection bottle 78 while packed red blood cells are communicated through the second outlet port 80 to the packed red blood cell collection bag 82.

Thereafter, plasma pumping ceases and the red blood cells which are stored in collection bag 82 along with added saline, as required, are reinfused into the donor by reverse pumping though unit 70 using blood pump 61 pumping in reverse. Cannula 85 may be connected to a source of saline and/or anti-coagulant (not shown) which may be admitted into bag 82 upon opening of solenoid clamp 65. Either saline solution or anti-coagulant in metered amounts is introduced as a suspending medium for the red blood cells, and the red blood cell suspension is pumped back through second outlet 80 of the separator unit 70 and thence through the inlet port 71 through the tubing connected to the donor back into the donor. This procedure is repeated a second time after the first reinfusion has been completed so that donor blood volume is never compromised. System operation is discontinued when the collected red blood cells have been completely reinfused into the donor a second time. For a donor having normal bleeding rates of 50 to 60 ml/min., the extraction process utilizing somewhat more than two half-liters of whole blood and yielding about one half-liter of undiluted protein rich plasma, takes approximately 30 minutes.

In order to facilitate the practice of the methods and principles of the invention as described in the foregoing, it was necessary to express these in rigorous quantitative terms that yield specific geometrical configurations and operating parameters. This is a discipline that can be applied by those skilled in analysis. Therefore, the detailed mathematics are not included here. On the other hand, a discussion of empirical data, design examples and several important assumptions would prove useful to those who would practice the invention. The pivotal principles which form the foundation of any design in accordance with the invention may be summarized as follows:

1. A couette membrane filter (after Lopez) is utilized wherein shear is induced by rotation independent of flow through the device.
2. The induced shear must be laminar (i.e., not turbulent), although the shear profiles are of a Taylor vortex character because a spinning core element in a stationary containment vessel is the preferred configuration (also in accordance with Lopez).
3. Departing now from Lopez, the invention seeks to optimize the use of the couette membrane filter configuration for separating mechanically sensitive suspensions by causing two things to happen simultaneously. These are:

A. Shear stress, i.e., $\tau = \mu S$, where $\mu$ is local viscosity and S is local shear rate, is required, by reason of design and operating parameters, to be constant over the entire actively filtering membrane surface. Thus, if shear stress is increased or decreased for any reason, e.g. as with spin rate, it must change uniformly over the entire membrane; and B. The local rate of filtrate flow through the membrane shall, everywhere, be just less than that which causes "polarization" or fouling of the membrane. This filtrate flow has the dimensions of a velocity and shall be referred to as the critical filtration velocity, $U_c$. (Note: ml/cm$^2$-sec is equivalent to cm/sec).

4. A feature which is attributed to many mechanically sensitive particles in suspension puts a limit on shear stress which uniquely characterizes their tendency to become damaged when subjected to shear flow near walls. This statement is strictly true only if item 3.B. above is also in effect. Otherwise, filter plugging is an overriding source of particle damage. Consequently, shear stress is allowed to increase, for example, by increasing the spin rate, only up to a point below the critical damage limit.

An immediate benefit follows from the above design criteria due to the fact that the critical filtration velocity, $U_c$ increases monotonically with increasing shear rate, S. If shear stress $\tau$ is everywhere uniform and accordingly, everywhere maximum, then it follows that S, and therefore $U_c$, is also maximized, although varying depending upon the local value of viscosity, $\mu$. Maximizing $U_c$ everywhere on the membrane and, in accordance with item 3.B. above, passing filtrate at a velocity very near that value, is equivalent to optimizing the performance of the device.

Furthermore, the fact that shear stress is the dominant source of particle damage under the stated operating conditions and is everywhere uniform in value means that the rate of particle damage is uniform over the entire membrane as well. One then selects the degree of acceptable damage by selecting spin rate. In effect, $U_c$ is everywhere maximum for the degree of particle damage that is determined to be acceptable. Blood being used as a spcific example, it is noted that red blood cells, RBC, are peculiarly damaged when the shear stress exceeds 1500 dynes/cm.$^2$ regardless of shear rate.

As with most particle suspensions, fluid viscosity will increase as plasma or filtrate is withdrawn, leaving a thicker suspension behind. This sets up the analytical problem wherein one must compute the local viscosity of the suspension in the face of varying particle concentrations as a function of axial position from suspension entry to thickened suspension exit under the operating conditions defined above. The solutions are peculiar to the type of suspension being filtered and its particular properties as noted above. Specific solutions will be given for normal human whole blood. Once the viscosity function is determined, one can manipulate geometric parameters, principally the shear gap thickness, to control the corresponding shear function such that $\mu S$ is a constant and the problem is essentially solved, provided one was also careful to avoid turbulence in the design. Even so, it will be seen in the discussion to follow that a wide selection of geometries is available within the principles of the invention. The flexibility lies mainly in the choice of spinner shape, although certain shapes are more conducive to stable laminar flow than others.

One central conclusion to be drawn from the analysis is that certain basic operating parameters, such as plasma extraction rate, on the whole and specifically as a function of position along the membrane (i.e., referred to throughout as critical filtration velocity), overall efficiency per unit membrane area, and expected rate of hemolysis (i.e., blood damage), can all be stated without specific reference to the geometry of the device, particularly spinner shape and gap thickness. It is further seen that spin rate is a unique function of the ratio of gap thickness to spinner diameter, that is, referred to a given point in the device such as at the blood entry end of the actively filtering portion of the membrane where the gap is usually narrowest. The narrower the gap, the slower one can spin and still reach maximum device efficiency, i.e., at the maximum accepted shear stress level. The choice is a practical trade-off between dynamic stability considerations and dimensional tolerances. The gap shape, that is, the way the gap thickness changes with position along the membrane, will depend upon the selection of spinner shape such that the $\mu S$ product is a constant over the entire active portion of the membrane. Finally, the choice of spinner shape, bearing in mind that it is always a surface of revolution about a spin axis, is mainly guided by practical manufacturing considerations after first satisfying the requirement for shapes that yield laminar flow conditions when used in accordance with the principles of the invention. The various design parameters of the filtration unit according to the present invention are discussed below in conjunction with FIGS. 15 through 26.

One of the most basic issues which must be addressed was alluded to earlier when it was stated that $U_c$ increases monotonically with S. Residual cell concentration cannot be computed without first knowing the rate at which plasma is removed, and this requires a more specific statement of the relationships between $U_c$ and S. The question of how to relate plasma flux to shear rate is best answered by the work of Blackshear and Forstrom (see appended reference BM 19, pp. 51–54) and, as amended by Porter and Lopez (see appended reference BB 8).

The former authors made use of a couette membrane filter configuration in which the outer wall rotated and the inner cylindrical membrane was stationary. They tested a variety of RBC suspensions including whole blood, human and animal, and hematocrits from near zero to about 40%. Their data clearly show a transition from the condition of non-polarization wherein RBC do not enter pores, noted by a lack of hemolysis, to polarization where they do enter the pores as signified by a sudden onset of hemolysis. A critical TMP at which this occurs was described by Zydney and Colton (see appended reference BE 11) who derived an expression for the dependence of plasma flux upon shear rate based upon the existence of the concentrated polarization layer and enhanced diffusion from that layer. However, it is the purpose of the applicant's invention to restrict operation of the device to the condition of depolarization as noted above. For this purpose Blackshear and Forstrom's definition of a critical filtration velocity, $U_c$ is more useful. It is quite literally the mean velocity of permeate through the membrane as averaged over an element of membrane area. It is not the actual velocity of permeate in a pore.

Blackshear and Forstrom (see appended reference BM 19, p. 56) first defined the critical filtration velocity as that value at which filtration drag is just balanced by repulsive forces at the membrane surface. Any greater filtration velocity will drive the RBC onto the membrane or into the pore. While it is difficult to compute the absolute magnitude of these several forces with precision, their dependence upon the controlling parameters can be deduced and a ratio formed between opposing forces. The ratio constnt can then be measured experimentally as well as the predictive accuracy of the functional relationship of parameters.

Blackshear's and Forstrom's analysis can be identified in greater detail in the extant scientific literature, whereas their results are given here only summarily. In brief, $U_c$ was found to be proportional to $S^{1.5}$ and a parameter they defined as $\lambda^{-1}$ which latter value depends only upon the local hematocrit, i.e., fractional cell volume of the blood being filtered. The proportionality also depends upon cell radius and suspending medium or plasma kinetic viscosity, but these are not design parameters to be determined. However, because the Blackshear/Forstrom experiments were conducted with a stationary cylindrical membrane and a spinning outer wall, the blood flow profile was limited to undisturbed couette shear of concentric laminar sheets of fluid. Given these circumstances, the actual shearing rate at the membrane surface is very nearly the nominal mean value given by spinner surface speed divided by gap thickness. On the other hand, when the inner surface, i.e., membrane, is spun, the blood flow profile is generally of the Taylor vortex type wherein the shearing rate within the laminar boundary layer is enhanced, see Lopez (see appended reference BG 13, p. 7), by the action of the induced secondary flow. In this instance, the relationship must be modified to:

$$U_c \propto \lambda^{-1} S^x$$

In accordance with Lopez, x can have a value of 1.5 to somewhat in excess of 2.0. The actual value is best determined experimentally as it is very difficult to predict reliably on purely theoretical grounds. It is believed that the best value for normal blood in accordance with the present invention is $x = 1.625$.

Another modification of the Blackshear/Forstrom (see appended reference BM 19, p. 64) formula is necessary because their expression for $\lambda$ is accurate only at low to moderate hematocrits which covers the range actually tested by Blackshear, i.e., 0 to 0.4. If the present invention is utilized for plasma collection in a typical clinical setting, blood enters at a hematocrit of about 0.4 to 0.45 and leaves at 0.8 to 0.9, or well above the range tested by Blackshear. For his purposes, Blackshear used a formula derived by Tam (see appended reference BV 28) based upon a stochastic analysis of point forces at the centers of spherical particles. The results are seen to be representative at low concentrations, but the formula predicts an infinite force for $H = \frac{2}{3}$. If spheres are packed together as close as possible without distortion, they can only occupy 74% of the available volume. Fluid flows through such a matrix without infinite resistance. It is clear that the model breaks down for H well below 0.67 whereas RBC can pack together so closely as to take up 97% of the available volume, Chien.

A more appropriate model for high hematocrit is given by Kays and London (see appended reference BZ 32, pp. 1-8), where the cloud of RBCs is treated as a stationary matrix of surfaces past which fluid must flow in order to traverse the membrane while leaving the cells behind, in effect, convective drag.

Figure 15:
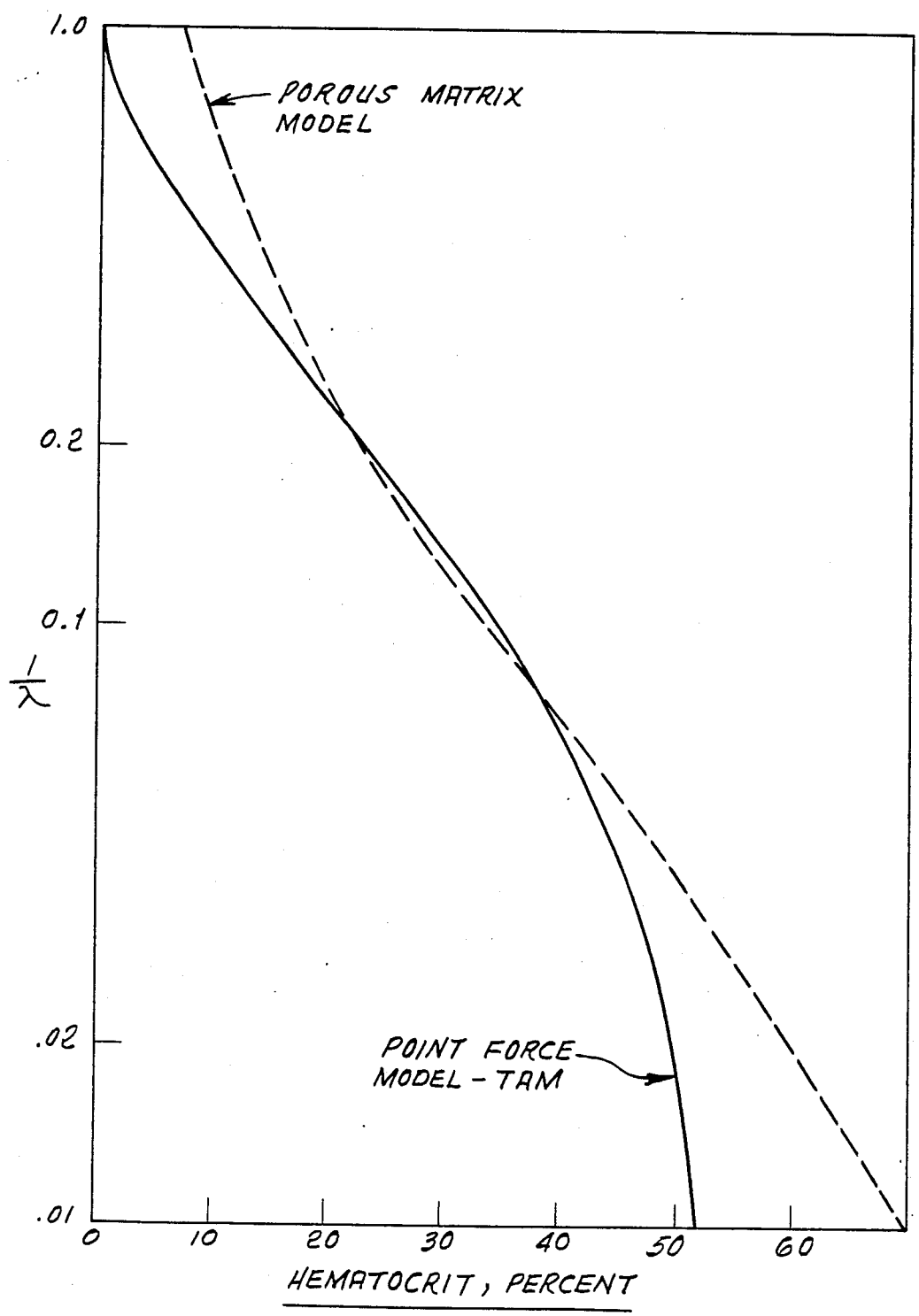
FIG. 15 is a graph plotting the variation of critical filtration velocity with hematocrit for two mathematical models of filtration apparatus.

A quantitative comparison of the two models is shown in FIG. 15 which is a plot of $\lambda^{-1}$, that is, the reciprocal of the Blackshear and Kays (see appended reference ibid BV 28 and BZ 32) parameters, respectively. It is seen that both expressions yield approximately the same values for H between about 0.2 and 0.4. Above 0.4 the Kays model prevails, justified only by the fact that this model does, indeed, correlate with observed empirical results. The importance of the $\lambda^{-1}$ function is quite apparent due to the profound effect it has on lowering the value of $U_c$ for increasing values of cell concentration. A reasonably accurate model is imperative, and, it is noted that in either model the parameter $\lambda^{-1}$ depends only upon hematocrit, H.

Given the now-established relationship between "critical" or, in effect, maximum filtration velocity, $U_c$ and the parameters shear, S and hematocrit, H through the $^{-1}$ function, it is useful to also state the relationship between blood viscosity, $\mu$, and hematocrit, H, so that the expression for shear stress, namely, $\tau = \mu S$, can be cast in the same parametric terms. The data published by Rand for high values of shear rate serves this purpose and can be summarized as follows:

$$\mu = a \exp[bH] \begin{cases} a = 1.4 \times 10^{-2} \text{ poise} \\ b = 2.6824 \end{cases}$$

a and b are constants which depend somewhat upon blood temperature, which dependency is ignored to keep the example as simple as possible. The stated values are for normal blood temperature of 37° C.

The critical filtration velocity model, together with the above expression for blood viscosity and the design criteria given, hereinabove, can now be combined with continuity expressions to yield the fundamental design equation, namely:

$$\int_{H_1}^{H(x)} \frac{\exp(1.875bH)}{H(1-H)^2} dH = k \cdot \int_0^x \frac{dx}{\cos[\tan^{-1}(D'_x/2)]}$$

x is position along the spin axis as measured from the beginning of the active filtering portion of the membrane near the blood entrance. See FIG. 17. The geometry of the device is inherent in this equation through the imposition of a constant or only slightly varying Taylor number. This mathematical condition assures that laminar flow can be maintained throughout the device. The only remaining unspecified geometrical parameter, namely, $D_x'$ is the local slope of the spinner surface relative to the spin axis at position, x. Subscripts 1 and 2 will hereinafter refer to entrance and exit values, respectively. The proportionality constant has physical meaning in terms of a rigorous mathematical derivation, but, for the sake of brevity, it is sufficient to say that k can be evaluated by setting the upper limits of the left- and right-hand integrals at $H_2$ and L, the spinner length, respectively. The ratio of the two integrals thus evaluated at their definable limits yields k.

Figure 21:
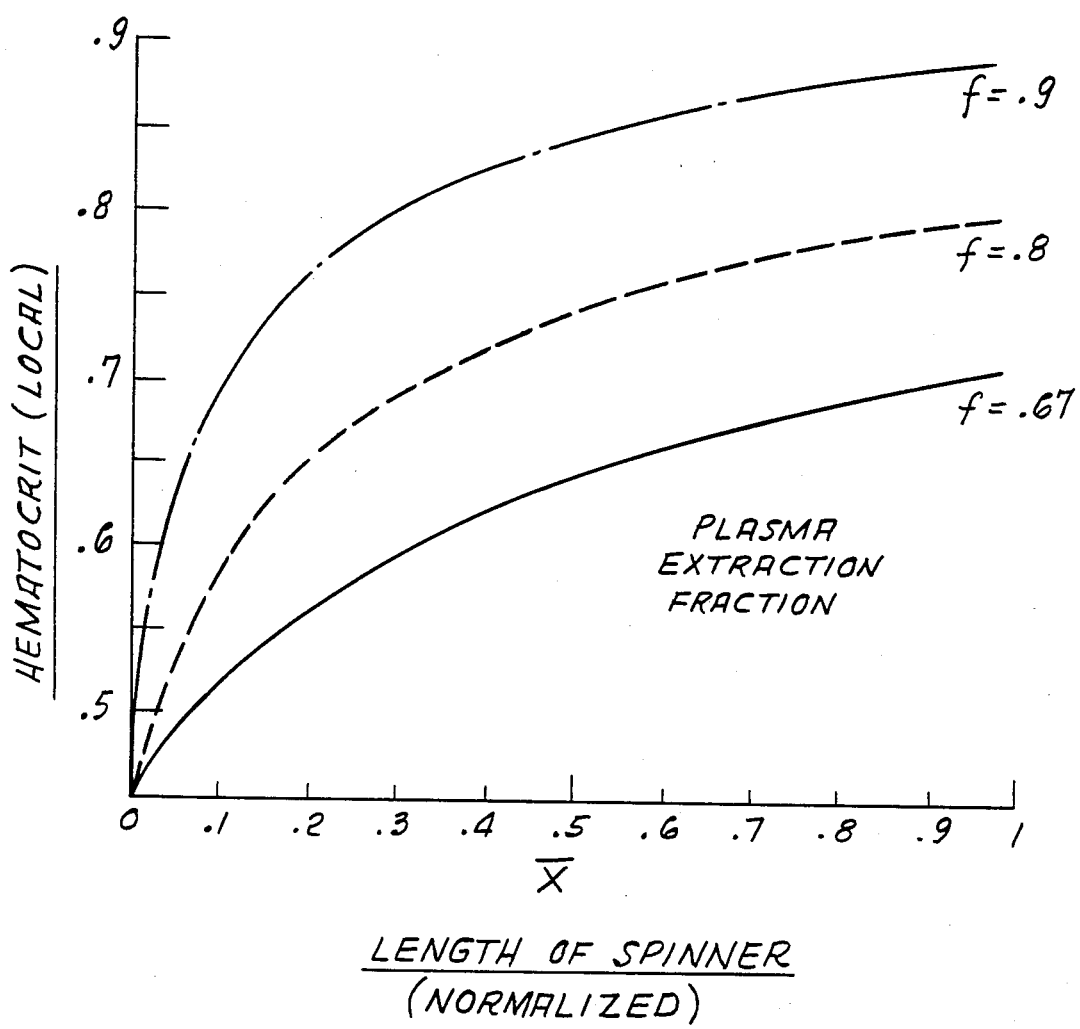
FIG. 21 is a graph depicting the variation of hematocrit with the normalized length of the spinner for several values of plasma extraction fraction.

The more important point to be made is that the left-hand integral is an analytic function in terms of the single parameter, H. The right-hand integral can be evaluated by numerical computer methods, again, in terms of the single parameter, x. It is literally the axial arc length of the spinner surface profile taken in section containing the spin axis. Thus, hematocrit, H is completely defined as a unique function of position, x, wherein it is only necessary to specify entering and exiting hematocrits, total rotor arc, or axial length, which are nearly the same, and an initial slope, $D_x'$ for the spinner at the blood entrance. This hematocrit function further defines the variation of viscosity with position by virtue of the relationship between $\mu$ and H given above and, in turn, the inverse variation of shear rate, S with $\mu$ which must be designed into the gap geometry. That is, $S = \tau_M/\mu$ where $\tau_M$ denotes the maximum permissible shear stress value for blood, namely, 1500 dynes/cm.$^2$ or some lower value. As so much depends upon being able to specify the hematocrit function, H(x), it is plotted in FIG. 21 as a function of the normalized position parameter, $\overline{X} = x/L$. Because the slopes, $D_x'$ in most practical designs are comparatively shallow, and the denominator in the arc length integral is a cosine function, there is very little effect upon the function $H(\overline{X})$ for a wide variety of design shapes, specifically, rotor shapes. The curves in FIG. 21 are, therefore, substantially representative of most practical shape configurations, even if those shapes are varied over many potentially useful options, provided the stated principles of the invention are maintained. The curves are plotted for several values of a plasma extraction fraction, f, defined as the fraction of available incoming plasma that is actually removed by filtration. The fraction, (1−f) is what is left to carry the concentrated RBC out of the device. The initial hematocrit, $H_1$ was selected to be a general population mean value of 0.45.

Another result that follows immediately from the principles of the invention, as represented in the fundamental design equation, without further regard for specific geometry, is the critical filtration velocity, $U_c(x)$ as a function of position along the actively filtering portion of the membrane. This result derives from having specified H, $\mu$, and S all as a function of position, x. One then uses the critical filtration velocity model referred to above to compute $U_c(x)$. It is one object of the invention to cause the actual plasma permeation rate to be equal to $U_c(x)$ everywhere on the membrane by design of the membrane substrate and permeate flow paths. The normalized function, $U_c(\overline{X})$ is essential for this purpose and is plotted in FIG. 26, again, for several values of f. The values of $U_c$ shown on the ordinate scale are in units of cm./sec. and represent actual plasma filtration rates obtainable from whole blood under a constant shear stress of 1500 dynes/cm.$^2$. The entering hematocrit is again taken to be 0.45. A striking feature of these curves is their precipitous drop very near the blood entry point. This may be interpreted to mean that most of the plasma is removed very quickly before the blood becomes too thick. Much of the remaining portion of the device serves largely to milk the remaining concentrated RBC suspension in order to achieve the specified end point plasma removal fraction, especially if that is an aggressive fraction. This characteristic can be attributed to the nature of the $\lambda^{-1}$ function shown earlier in FIG. 15. Simply stated, as blood thickens with cells, it very quickly becomes increasingly more difficult to extract plasma.

Given the distribution of plasma flux, it is possible to integrate over the membrane area to obtain the overall performance of the device which can be stated in terms of general operating parameters. It is convenient to define the total plasma flux rate, $\dot{P}$ in relation to the incoming blood flow rate, $\dot{V}_{B1}$. In effect, $$\dot{P} = (1 - H_1)f\dot{V}_{B1}$$

where $H_1$ and f are as defined above. The outlet hematocrit, $H_2$ is uniquely related to f given the initial hematocrit, $H_1$.

$$H_2 = \frac{H_1}{1 - f(1 - H_1)}$$

A mean filtration velocity, $\overline{U}$ for the device as a whole may be written as:

$$\overline{U} = \dot{P}/A_M$$

where $A_M$ is the active membrane area. $\overline{U}$ is the principal figure of merit for the device. Given $\overline{U}$, one can scale the membrane area to obtain any desired total plasma flux rate, $\dot{P} = \overline{U}A_M$, provided, of course, that $\dot{V}_{B1}$ is great enough to supply the plasma.

Figure 19:
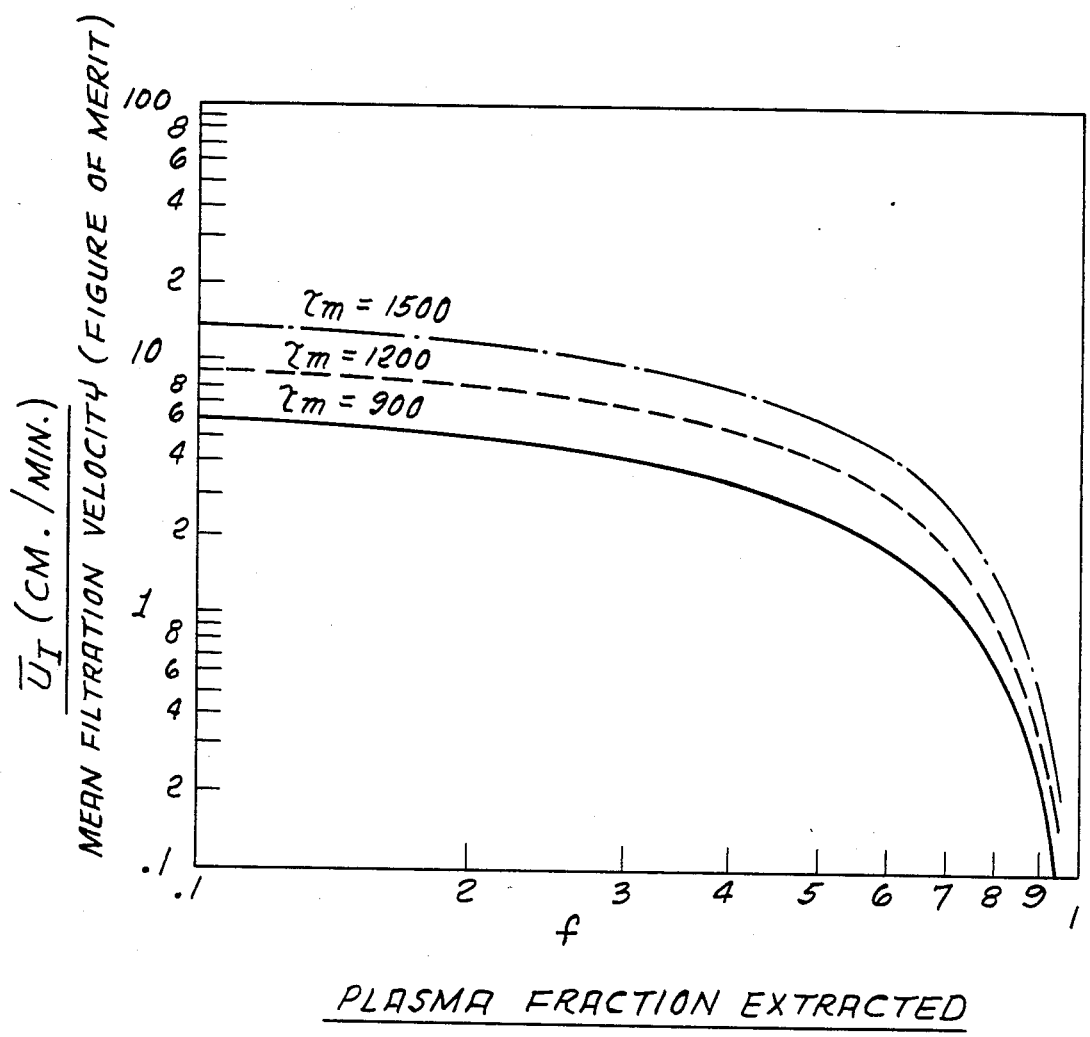
FIG. 19 is a graph depicting the mean filtration velocity of the present invention as a function of plasma fraction extracted for several values of shear stress $\rho_M$.

Not unexpectedly, we find that, as one attempts to extract higher fractions of plasma, the figure of merit diminishes, whereas it is higher for larger values of maximum operating shear stress. This is shown in FIG. 19 which plots $\overline{U}$ vs. f for several values of $\tau_M$. If one takes only half the incoming plasma, it is possible to get 6 cm./min., i.e., 6 ml. per minute of plasma per cm.$^2$ of membrane at a shear stress of 1500 dynes/cm.$^2$. At 80% plasma extraction, this value drops to about 1.6 cm/min. Compared to other methods of membrane filtration of plasma, this is still an extraordinarily high value.

It is particularly instructive to compare the figure of merit in accordance with the invention with that obtained using the Lopez (see appended reference BH 14) couette membrane configuration. The latter describes an essentially constant shear *rate*, whereas the instant invention describes a constant shear *stress*. In the interest of a strict comparison, the Lopez configuration will be allowed the optimum benefit of operating everywhere at the critical filtration velocity, although Lopez never actually addressed the issue of varying conditions within his device. It is still the closest approximation of the instant invention in the extant literature. Although not explicitly presented here, the fundamental design integral equation for the Lopez configuration is somewhat different from that presented hereinabove in accordance with the principles of the instant invention. However, the same mathematical technique is applicable and yields the required specification of H, $\mu$, and $U_c$. S, of course, is constant. Integration of $U_c$ yields a value of $\overline{U}$, and we form the ratio:

$$\frac{\overline{U}(\text{Instant invention})}{\overline{U}(\text{Lopez})}$$

Figure 20:
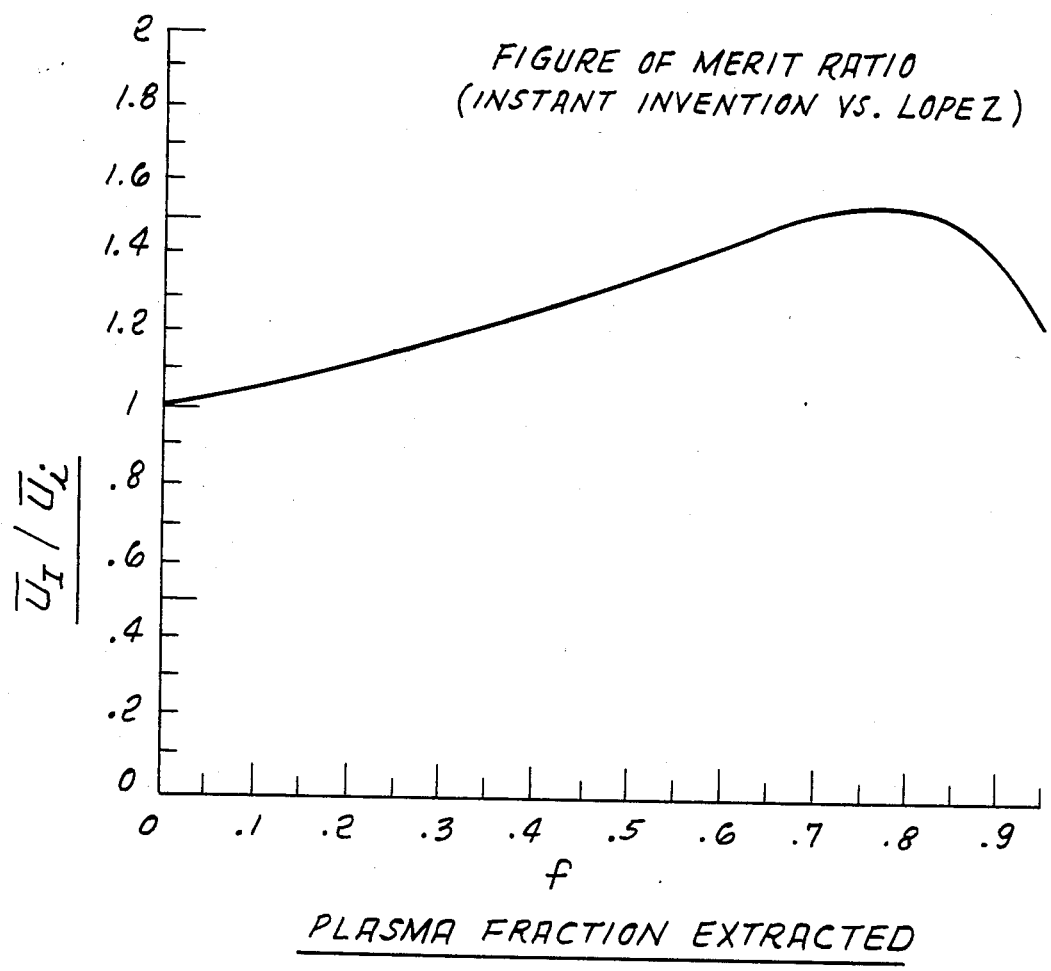
FIG. 20 is a graph illustrating the improvement in the figure of merit of the present invention relative to the prior art (Lopez) as a function of the plasma fraction extracted.

The result of this calculation depends only upon f, given $H_1$, and is plotted in FIG. 20 for $H_1 = 0.45$. Clearly, the filtration efficiency that can be achieved with constant shear *stress* is greater than that achieved with constant shear *rate*. The degree of improvement does not depend upon either the shear stress or shear rate values that are utilized. Initially, at f=0, there is no improvement because there is no change in viscosity from entrance to exit. As f increases to 0.73, the improvement ratio rises at a slightly increasing rate to about 1.54 or a 54% greater filtration rate in the device as practiced in accordance with the invention over that of Lopez. This level of improvement holds to a value of f=0.81. At higher values of f, the ratio falls off until it is again null at f=1.0. The latter effect is due to the fact that, when one attempts to take all of the incoming plasma, i.e., f=1.0, then both devices approach zero efficiency of operation; that is, both require an infinite amount of membrane. This interesting result shows that there is an optimum degree of improvement, and that it occurs when one withdraws approximately 77±4% of the incoming plasma. The maximal improvement over Lopez should be regarded as significant, because it not only reduces the size and probable cost of the device by 35%, but the effect upon blood damage is similarly reduced, as will be described immediately below.

So long as plasma flux is never driven beyond the critical filtration velocity for either the instant invention or the device designed according to Lopez (ibid), the two may be compared as to their effect on RBC damage, i.e., hemolysis. The primary source for hemolysis under this condition is occasional interaction of the cells with the membrane surface, even if cells do not remain on, or pass through, the membrane. Sutera (see appended reference CF 38) described this process in quantitative terms by measuring the rate at which hemoglobin is lost by RBCs subjected to shearing in a couette viscometer. Again, it was found that hemoglobin loss was uniquely related to shear stress, not shear rate. When the wall interaction parameter of Sutera is transformed in terms of the analysis herein and integrated over the total quantity of processed blood, it is possible to derive a value for the concentration of free, i.e., unbound hemoglobin contained in the residual plasma which remains to carry the concentrated RBCs. This value, designated $Hb_r$ is proportional to $\tau^{\frac{8}{3}}_M$, that is, the shear stress raised to the power $\frac{8}{3}$. The proportionality coefficient is a function of f and $H_2$ only, except that it is higher in the Lopez configuration by the magnitude of the ratio of $\overline{U}$ for the instant invention to $\overline{U}$ for Lopez plotted earlier in FIG. 20, also as a function of f. Consequently, if one removes about 80% of the incoming plasma, the residual plasma in the Lopez device will have a 54% higher concentration of free hemoglobin that would be present in the residual plasma of a device in accordance with the invention.

However, what really counts in a clinical setting is how the plasma free hemoglobin of the donor is affected after donation is completed. The criterion for clinical acceptability of any design requires that the plasma donor not be adversely affected. In order to assess this effect, we may write the percent increment, %ΔHb of free hemoglobin found in the plasma of a normal donor as:

$$\%\Delta Hb = \frac{\left(\frac{1-f}{f}\right)\left(\frac{Hb_r}{Hb_n} - 1\right) \times 100}{\left(\frac{P_b}{P_p} - 1\right) + \left(\frac{1-f}{f}\right)}$$

where $Hb_n$ is the concentration of free hemoglobin in normal plasma, and $P_b$ is the total body volume of plasma, both quantities being measured in the normal donor prior to donation. $P_p$ is the total amount of plasma collected from that donor. The plasma-free hemoglobin concentration in the donor after donation, $Hb_D$ is:

$$Hb_D = Hb_n\left(1 + \frac{\%\Delta Hb}{100}\right)$$

A typical range of values for $Hb_n$ in the normal adult population is 2 to $3 \times 10^{-5}$ gm./ml. A typical value for $P_b$ is 3.0 liters and $P_p$ for that size adult is 600 ml. or about 20% of the donor's pre-donation plasma volume.

Figure 16:
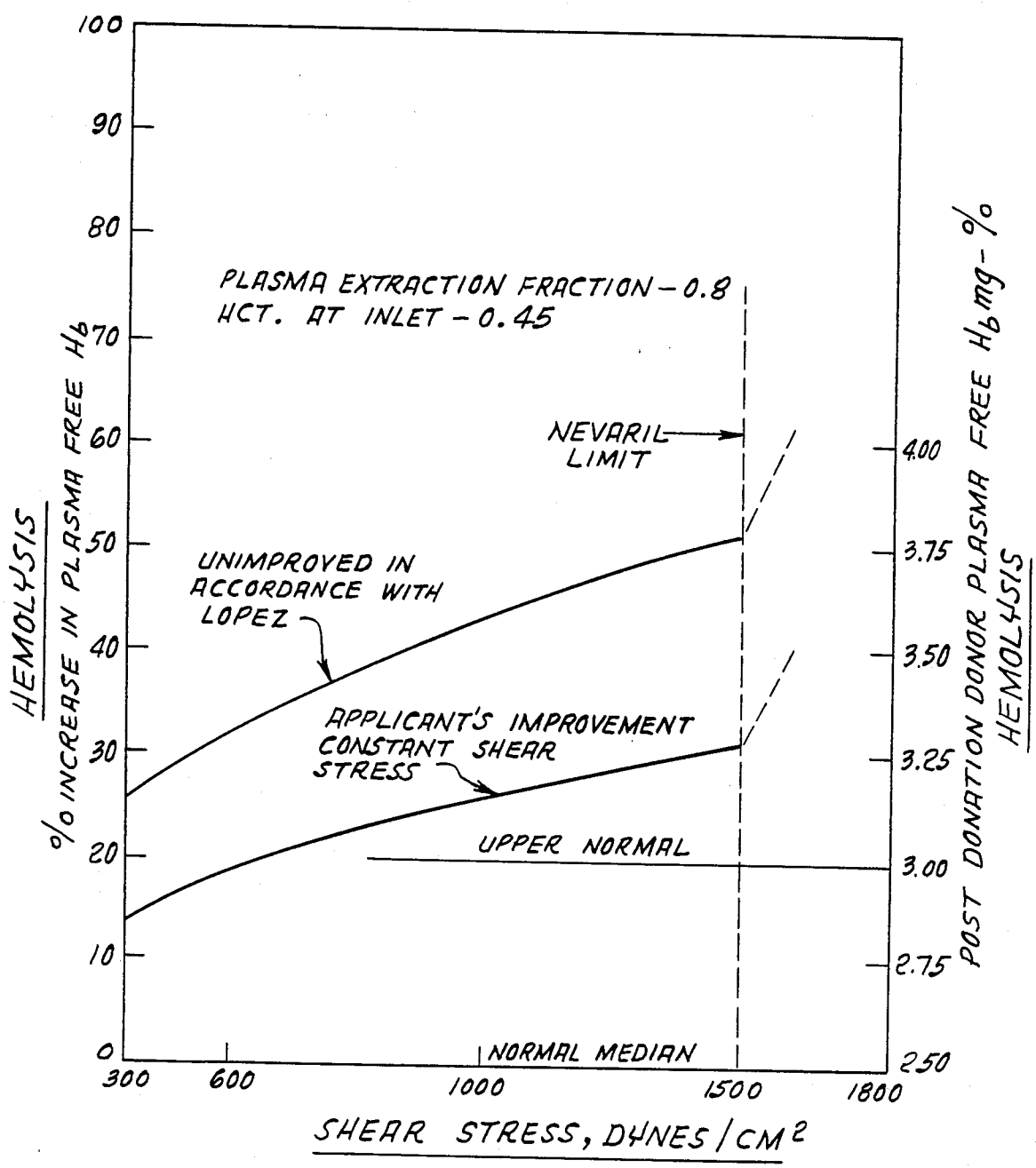
FIG. 16 is a graph plotting expected hemolysis vs. shear stress illustrating the improvement obtained by the present invention in comparison to the prior art.
Figure 17:
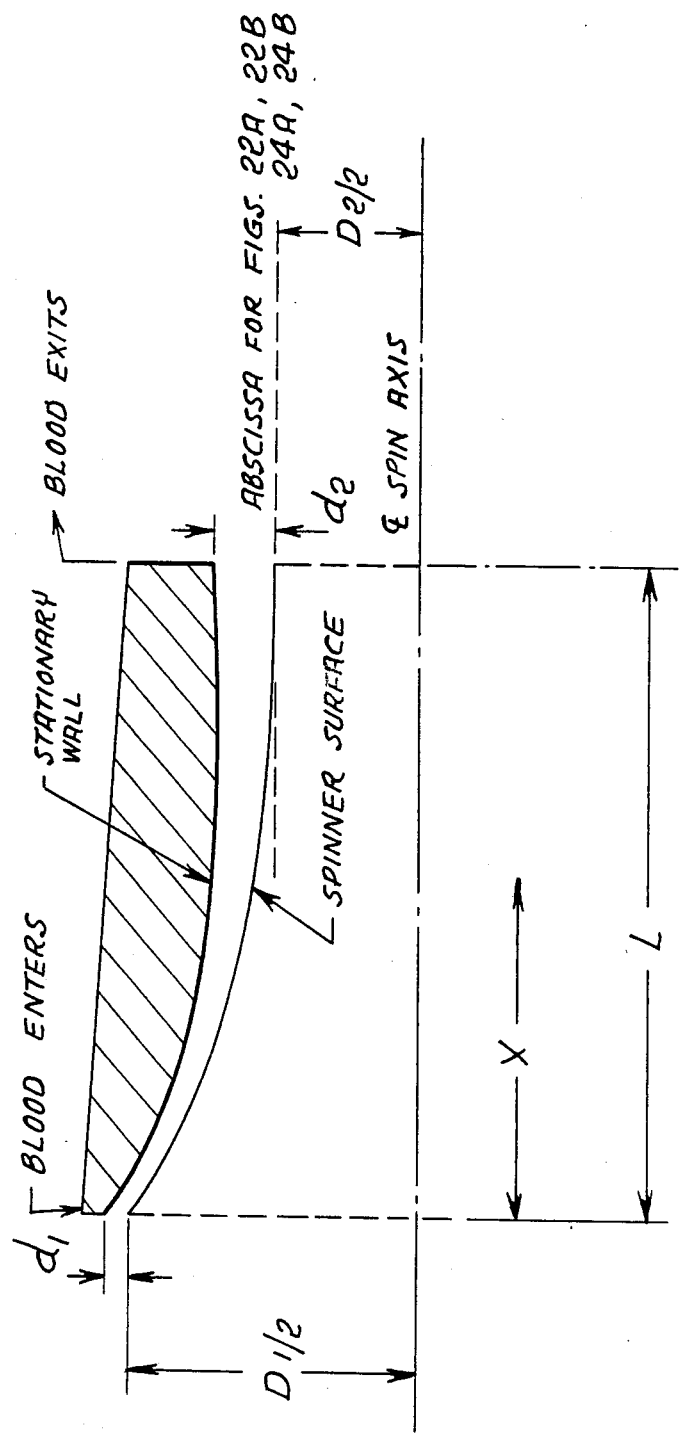
FIG. 17 is a schematic diagram illustrating the gap dimension between the membrane and the stationary wall of the containment device according to the present invention.

Using the above expressions and a starting value of $Hb_n$ in the mid-range, or $2.5 \times 10^{-5}$ gm./ml., FIG. 16 shows how %ΔHb and $Hb_D$ vary with applied shear stress, $\tau_M$. The curves presuppose constant shear stress throughout the gap which, indeed, describes the device when designed in accordance with the instant invention. The assumption is not valid if the Lopez (ibid) configuration is used without alteration. The comparisons are, nevertheless, instructive. The upper curve represents how the unmodified Lopez configuration would be expected to perform under the conditions cited above. It is seen that, starting from a median value of $2.5 \times 10^{-5}$ gm./ml., the physiological upper normal value of $3.0 \times 10^{-5}$ gm./ml. is reached before the Nevaril (see appended reference CE 37) limit of 1,500 dynes/cm.$^2$ can be usefully applied. This is an arbitrary limit; one might say that $4.0 \times 10^{-5}$ gm/ml. is not an unreasonable plasma free hemoglobin level which the healthy donor would quickly clear from his system. But, this is not equivalent to saying the frequent, repeating, plasma donor is clinically unaffected. On the other hand, if the improved efficiency of the instant invention is utilized, one may expect the performance of the lower curve, wherein, the donor plasma hemoglobin increases from the median level to what might be a more acceptable upper level, i.e., a 32% increase, only after the Nevaril critical limit of shear stress is first reached. In either case, one must be in a position to say that the donor is clinically unaffected or medically uncompromised for all practical purposes. It is noted that there is no proven medical basis for any of these arbitrary plasma hemoglobin limits but, in the absence of confirmed long range clinical evaluation, one is compelled to adopt the most conservative possible judgment, particularly if the health of a frequent and persistent donor is in question. In any case, it is clear that the instant invention allows one to operate at much higher shear stress levels and, therefore, much higher filtration efficiency for any given hemolysis limit.

The final step in the analysis deals with a specific determination of geometrical parameters. While the shape of the spinner, that is, its diameter, $D(\overline{X})$ as a function of normalized position, $\overline{X}=x/L$ is somewhat arbitrary, within the limits of laminar flow, once $D(\overline{X})$ is specified, the gap thickness, $d(\overline{X})$ is rigorously determined. The most general statement which describes the behavior of the function, $d(\overline{X})$ ($\overline{X}$ is, by convention, always measured from the point of blood entry) is:

$$d(X) = \left(\frac{\sqrt{2}\,a}{\rho_B \Omega}\right)^{\frac{1}{3}} [T a(X)]^{\frac{1}{3}} [D(X)]^{-\frac{1}{3}} \exp(\tfrac{2}{3}bH(X))$$

The first factor on the right-hand side is a proportionality constant including the constant, a, defined earlier above, the blood density, $\rho_B$, and the spin rate, $\Omega$ in radians per second. All units are in cm., gm., and seconds, unless otherwise specified. The second factor, Ta is the Taylor (see appended reference BG 13, p. 7) number which has been allowed to vary, to a limited extent, with position, $\overline{X}$. The third factor depends upon spinner shape, and the fourth factor makes use of the function, $H(\overline{X})$ previously determined above. It is this latter factor which has the most powerful effect on the change of d with $\overline{X}$. In effect, because H always increases monotonically with $\overline{X}$, the exponential function tends to dominate over any reasonable change in Ta or D so that d generally increases monotonically with $\overline{X}$ as well.

The issue of laminar flow is unequivocally settled by the magnitude of the Taylor number, given the inner spinning member and stationary containment vessel of the instant invention. A preferred, but not essential, range of operation would be for Taylor numbers in excess of 40, where laminar Taylor vortices obtain and serve to enhance the shearing effect at the membrane surface. On the other hand, much larger Taylor numbers are not preferred, as these tend toward general turbulence. One way to assure that the latter condition does not occur is to require that the Taylor number does not vary significantly as a function of position, $\overline{X}$.

In fact, if the Taylor number is held rigorously constant, then both the gap thickness, $d(\overline{X})$ and the spinner diameter, $D(\overline{X})$ are uniquely determined as follows:

$$D(X) = \left[D_1 \exp\left(\frac{b}{4} H_1\right)\right]/\exp\left(\frac{b}{4} H(X)\right)$$

$$d(X) = \left[d_1/\exp\left(\frac{3}{4} bH_1\right)\right]\exp\left(\frac{3}{4} bH(X)\right)$$

The numerical subscripts again indicate entering or exiting values. The first factor in the right-hand side, in square brackets, is a constant coefficient. The shapes are controlled by the exponential functions, and it is obvious that $D(\overline{X})$ gets smaller with increasing $\overline{X}$, while the gap, $d(\overline{X})$ gets bigger. These curves are plotted in FIGS. 22A and 22B on an exaggerated scale so that the relative profiles can be more easily appreciated. What is actually plotted are the quantities:

$$D' = \frac{1}{2}[D(X) - D_2]/D_1$$

$$d' = \frac{d(X)}{D_1} + D'$$

Figure 22A:
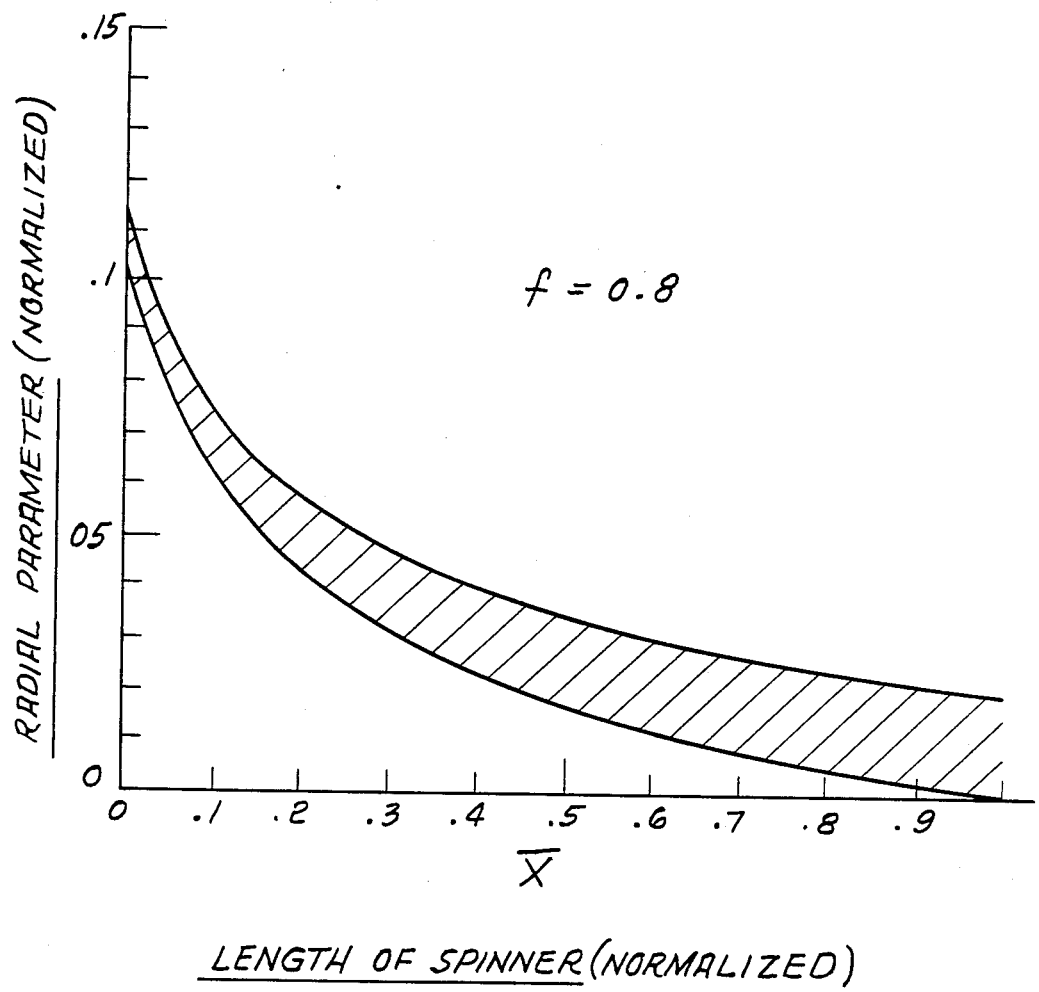
FIGS. 22A and 22B are graphical illustrations of the qualitative variation of gap spacing as a function of normalized length of the spinner for plasma extraction fractions of 0.8 and 0.9 respectively.
Figure 22B:
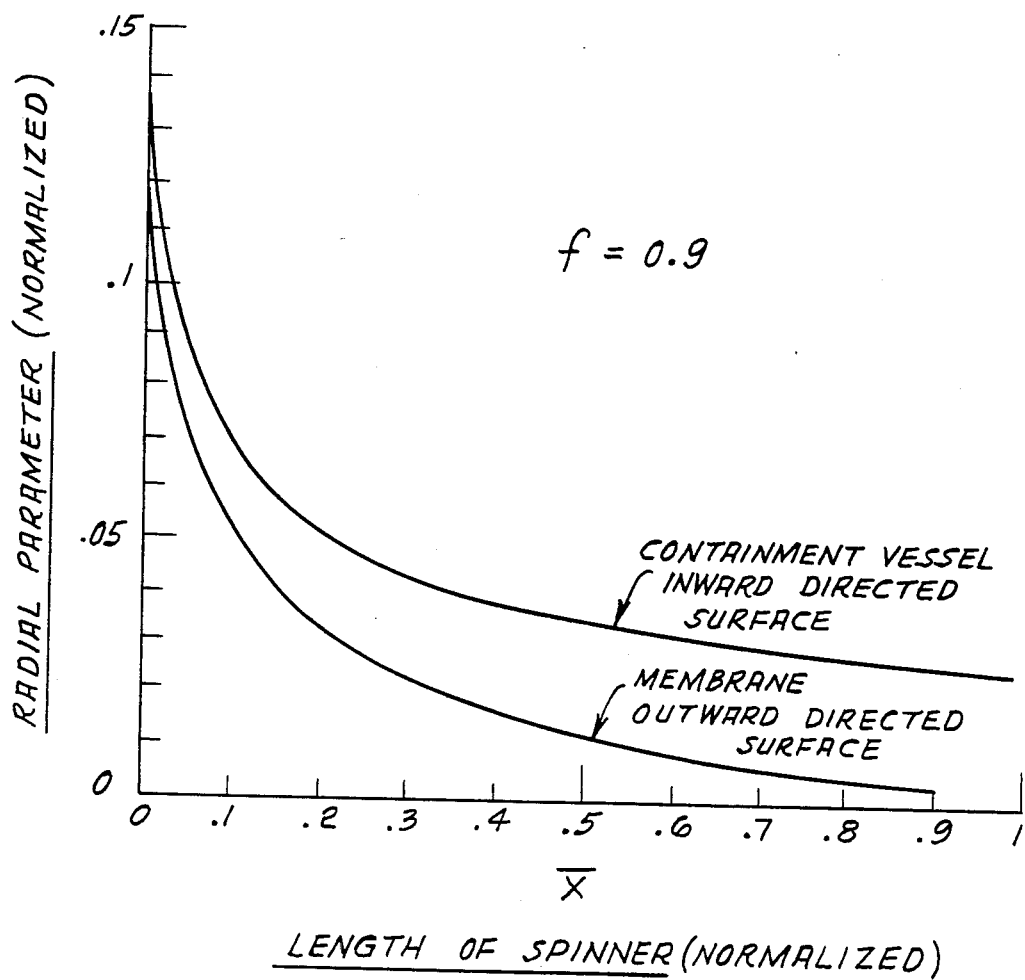
Figure 23:
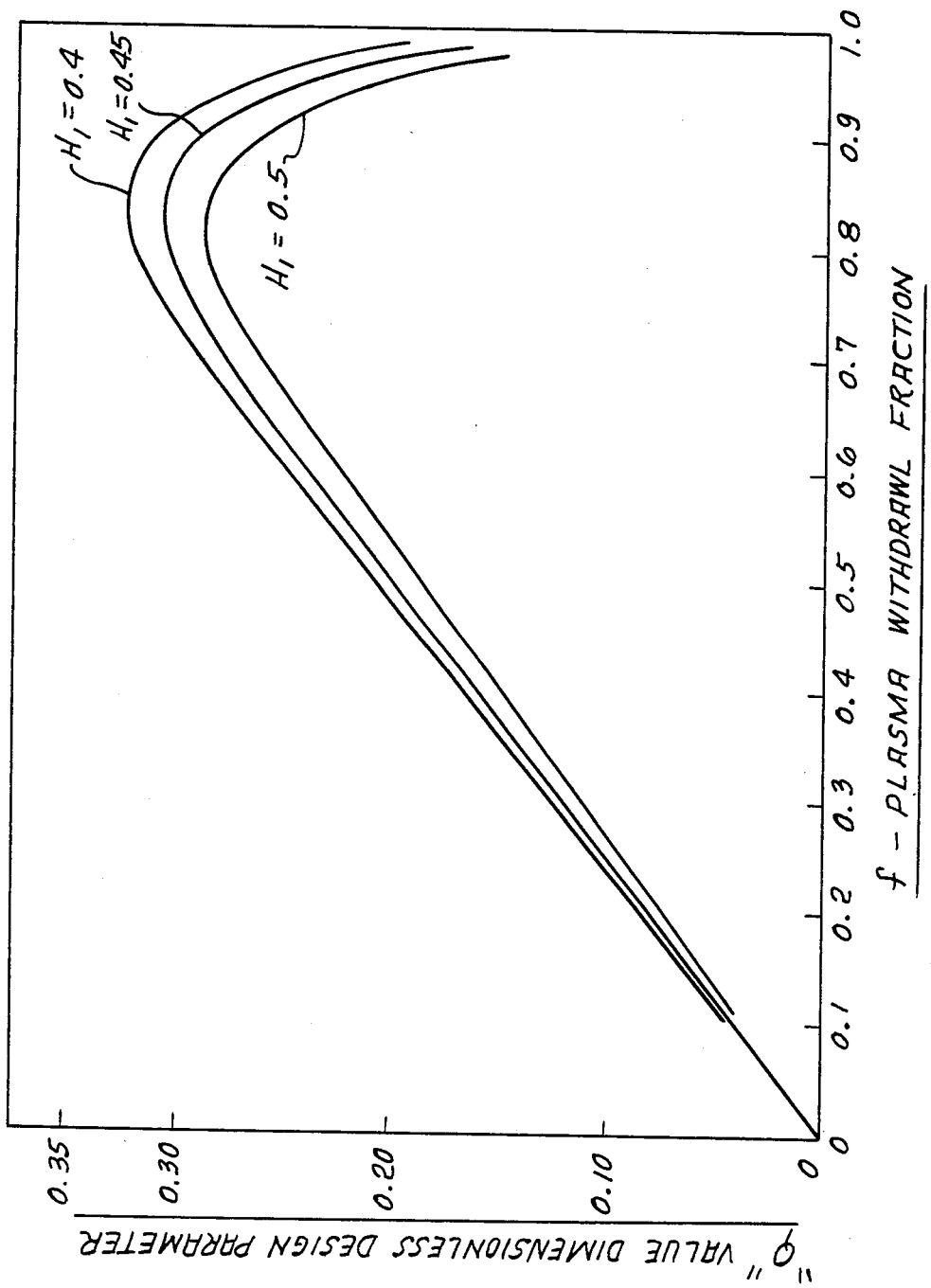
FIG. 23 is a graph showing a design parameter of the device according to the present invention as a function of plasma fraction for several values of $H_1$.

In this way, all the dimensional quantities are normalized relative to the initial spinner diameter, $D_1$, and only the curvatures are shown, these being relative to an axis which intersects the terminal diameter, $D_2$ and is parallel to the spin axis. See FIG. 17. This graphical convention allows one to depict subtle curvatures and very narrow spacings on an expanded scale. It should be understood that the exaggerated curvatures of FIGS. 22A and 22B are of schematic significance only, and that the geometry, when drawn in uniform proportions, is characterized by slight curvatures approximating truncated cones and close spacing. It is noted that the curvatures of FIGS. 22A and 22B, shown for f=0.8 and 0.9, respectively, are easily scaled to any size device upon selection of $D_1$, $d_1$, $H_1$ and L. Selecting f uniquely establishes the function, $H(\overline{X})$.

The selection of $d_1$, $D_1$, and L should not be arbitrary. It is guided by the fact that the spin rate, $\Omega$ is uniquely related to the ratio, $d_1/D_1$ in accordance with the curves shown in FIG. 18, where $\Omega$ is plotted in units of R.P.M. for several values of shear stress, $\tau_M$. For example, if $d_1/D_1$ is 0.01 (i.e. a 0.011" gap for a 1.1" initial diameter spinner), the spin rate for 1500 dynes/cm.$^2$ of stress is 6100 R.P.M. If one prefers a larger gap, it is seen that a 0.022" gap requires 12,200 R.P.M. for maximum usable shear stress, i.e., maximum efficiency. Clearly, one wants the narrowest practical gap.

Figure 18:
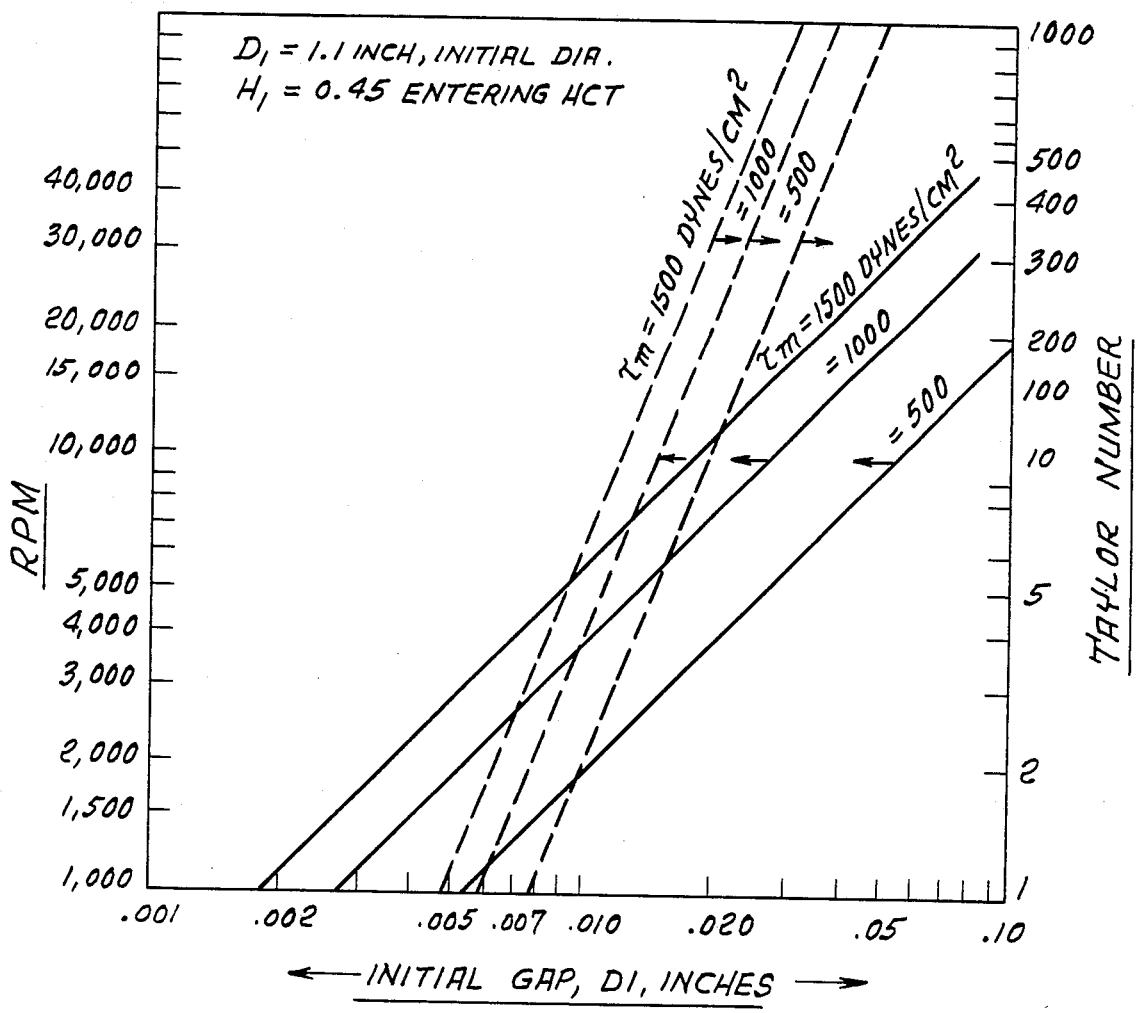
FIG. 18 is a graph illustrating the relationship of Taylor numbers and angular velocity of the spinner as a function of the initial gap spacing of the membrane and stationary wall.

Also plotted in FIG. 18 is the Taylor number, Ta as a function of the actual initial gap dimension, $d_1$. Using the same two examples above, a 0.011" gap corresponds to a Taylor number of 76, while the 0.022" gap operates at a Taylor number of 420. The narrower gap is clearly within the laminar Taylor vortex range. The larger gap is not so certain.

As a practical matter, the curvatures shown in FIGS. 22A and 22B, although exaggerated, clearly suggest, on the one hand, the difficulty that one would experience in trying to mount flat sheet membranes on a doubly-curved spinner while, on the other hand, when viewed in true scale, the close approximation of the spinner to a frustum of a right truncated circular one. Recalling that, in any case, the spinner shape is somewhat arbitrary, one would be well advised to relax the condition of a rigorously constant Taylor number and opt for a spinner having a straight-sided profile when viewed in axial section, i.e., a truncated cone. One could select an apical angle that most closely approximates the spinner of FIGS. 22A, 22B. The gap spacing is essentially unaffected if measured relative to the new spinner profile. A more rigorous approach, which is offered herein as the most preferred embodiment of the instant invention, selects an apical angle which minimizes the root mean square variation of Taylor number as averaged over the active membrane surface. This approach, for all practical purposes, maintains adequate control over the Taylor number while permitting the needed flexibility to choose a more easily fabricated spinner design. The results of these rather complex calculations can be summarized as follows:

$$D(X) = D_1 - hLX$$

$$d(X) = d_1 \left(1 - \frac{hLX}{D_1}\right)\exp(H(X) - H_1)$$

Figure 24A:
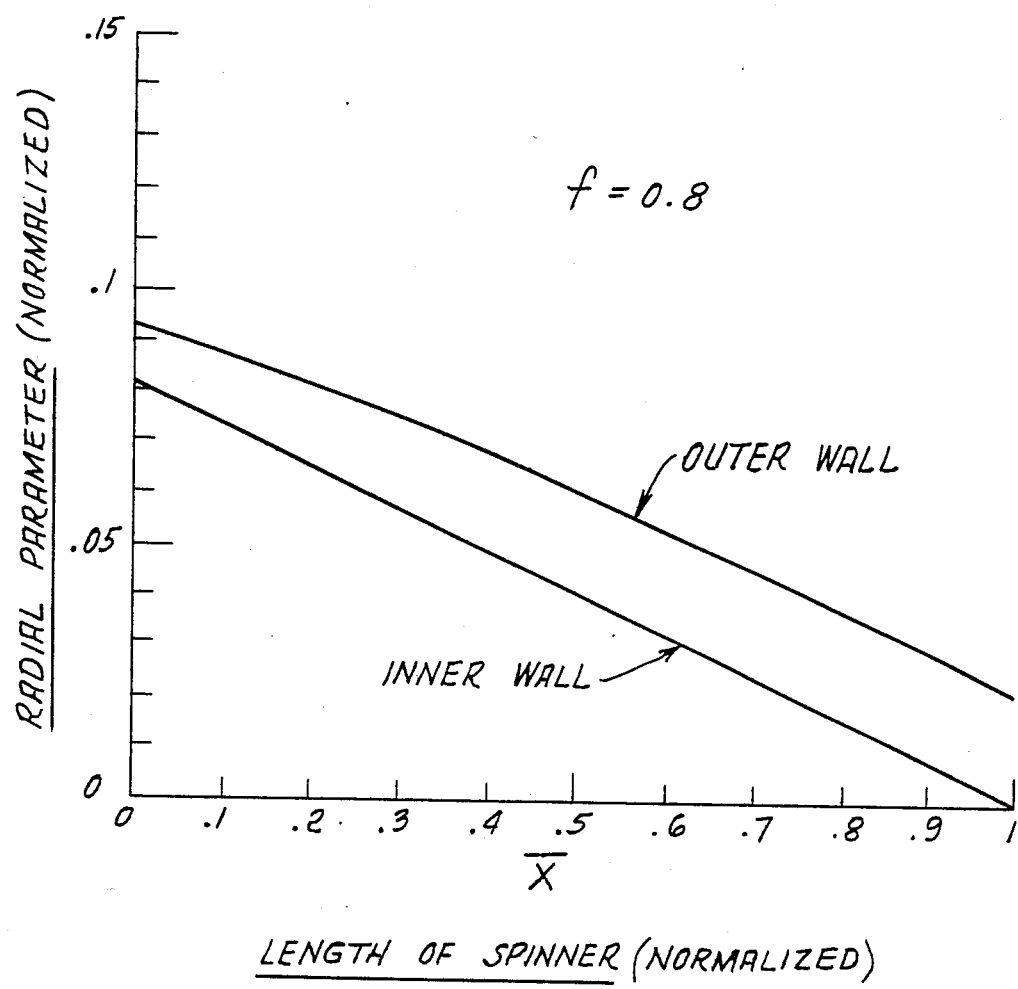
Figure 25:
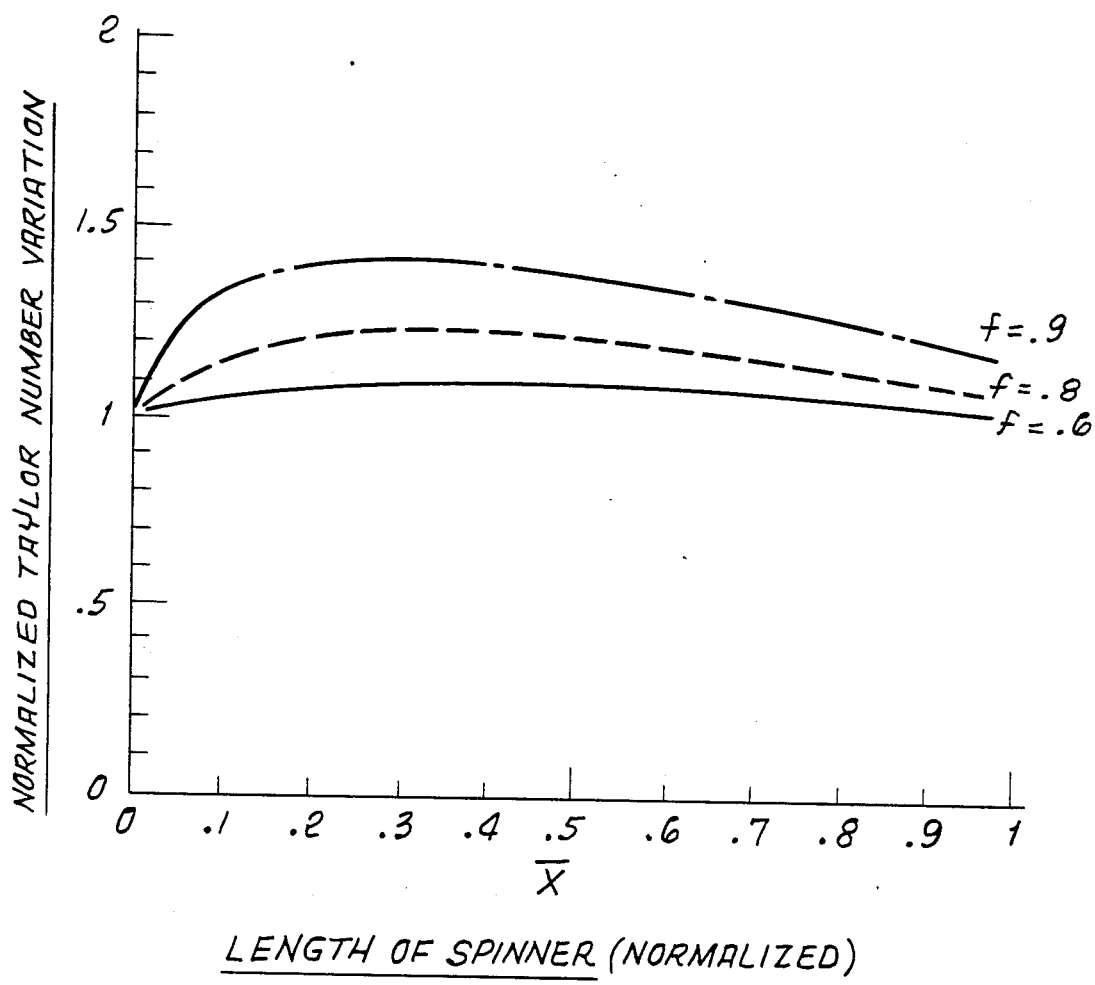
FIG. 25 is a graph plotting the normalized Taylor number of the device as a function of normalized length.

The first expression is simply a cone extending from $\overline{X}=0$ to $\overline{X}=1.0$. The second expression is the increasing spacing relative to that cone. The parameter, h will be specified momentarily. h/2 represents the slope of the sides of the cone relative to the spin axis. A plot of these surfaces, shown in axial cross section, and in a manner entirely analogous to the curves of FIGS. 22A and 22B, are represented in FIGS. 24A and 24B, again, for f=0.8 and 0.9, respectively. As specified, the spinner is straight sided, that is, curved only about its spin axis, while the containment vessel has an interior profile which is convex outward. As shown in FIG. 24A, the ratio of the gap radial dimension between the inner and outer walls near the outlet, to the gap dimension near the inlet, i.e. proximate axially opposite ends of the gap, is about 1.65 or greater. In the previous example, the profile is concave outward. The initial boundary values, $d_1/D_1$ and $d_1$ are selected as previously described using the curves in FIG. 18. This will yield an initial boundary value for the Taylor number $Ta_1$. In this example, however, $Ta(\overline{X})$ is not invariant, but can be calculated as shown in the curves of FIG. 25. The plot is of $Ta(\overline{X})/Ta_1$, that is, the normalized variation. One can note that the variation reaches a peak and then subsides, indicating quite adequate restriction of the Taylor number variance. For example, for $f=0.8$, the Taylor number increases, at its maximum excursion, by only 25% over its initial value at $\overline{X}=0$. In the example used previously, if $d_1$ is taken to be 0.011" and $D_1$ to be 1.1", the Taylor number would go from 76 to somewhat less than 100 at its maximum excursion. This is a range which assures laminar flow within the shear gap.

In order to complete the geometrical specification, the value of h is determined as follows:

$$h \cos\left(\tan^{-1}\frac{h}{2}\right) = \frac{\pi D_1^2}{24_M} Q$$

This expression must be solved for h after first specifying the initial diameter, $D_1$ and the required membrane area, $A_M$. As previously explained, $A_M$ is scaled in accordance with the device effectiveness, $\overline{U}$ where $A_M = P/\overline{U}$ or, the ratio of total plasma collection rate in ml./min. to the figure of merit in cm./min. The parameter, Q derives from minimizing the variance of Taylor number and is plotted in FIG. 23 as a function of f for several values of initial hematocrit, $H_1$. Using the typical average of 0.45 hematocrit and an operating plasma extraction fraction of 0.8, Q has a value of about 0.305.

The foregoing analysis has been based upon the premise that the critical filtration velocity, $U_c(\overline{X})$ plotted in FIG. 26 obtains at all points along the membrane. When plasma is initially drawn through the membrane this condition may or may not be satisfied, depending upon the design of the underlying membrane support in relation to the dynamics of plasma flow. Nevertheless, when steady state is reached and maintained the stated condition automatically prevails. This is due to the fact that filtration of suspensions is a self-limiting process, see Porter (see appended reference BB 8). Initially, given that TMP does not vary significantly over the membrane surface, the flux velocity is essentially uniform before the variation of hematocrit is impressed upon the axial distribution of RBC. As the concentration of cells increases near the outlet, the filtration flux velocity at that point is too high to prevent concentration polarization so that cells impinge the membrane and begin to plug the pores to some degree. This causes increased membrane resistance and retards the flow of permeate. If the total mean filtrate flux, $\overline{U}$ is controlled by other means, in other words, held invariant, the drop in actual flux velocity, U near the exit must force an increase in that velocity near the entrance where it was initially well below the critical value, $U_c$ described hereinabove for given conditions of shear and hematocrit. So long as U, at any point along the membrane continues to exceed the critical value, $U_c$ for that point, the membrane will continue to plug and form a concentrated polarization layer, and U must continue to fall, ultimately to the value, $U_c$, which is the highest value U can have without further increasing net effective transmembrane resistance. If $\overline{U}$ is restricted to that specified hereinabove for the stated conditions, then U will rise from its initial value near the entrance of the device to the critical value $U_c$, while U will fall from its initial value near the exit of the device to the critical value, $U_c$ for those conditions. The flux velocity distribution, such as that shown in FIG. 26 represents the final equilibrium condition achieved, in part, by the formation of an increasing degree of concentration polarization toward the blood exit of the device.

In such circumstances the sensible TMP across the membrane is still virtually uniform but, in those sections where concentration polarization exists to some degree, a portion of the TMP is used up across the concentrated layer of cells. Hence, the effective TMP is less than the observed value which accounts for most of the decrease in U. Only when U is less than, or equal to, $U_c$ does the concentrated cell layer cease increasing. Nevertheless, it is physically possible to increase the impressed TMP so that U is greater that the value specified herein as being the correct limit in accordance with the principles of the instant invention. This compels polarization of the entire membrane, defeats the type of operation and method described herein and becomes a system in which the membrane operates more in accordance with that described by Solomon, Castino, or Zydney (see appended references AY 5, BD 10, BE 11, respectively).

In order to avoid even the initial polarization of a portion of the membrane it is possible to impose a permeate flux velocity distribution, $U_c(\overline{X})$, such as that illustrated in FIG. 26, by artificially creating a variation in TMP. It is in the nature of the device concept, as first used by Lopez and subsequently improved in the invention herein described, that the resistance to flow of the feed solution, blood in the present case, across the entire device, is inherently low. Consequently, the static pressure on the blood side does not vary significantly from entrance to exit. However, resistance to *permeate* flow can be increased within the membrane support structure. Any number of mechanical means can be devised to effect this result. Some examples are, (1) narrowing the channels 17 underlying the membrane 18 (see FIGS. 2 and 9) so that more of the membrane is masked by its support structure while the outflowing permeate (e.g., plasma) experiences greater flow resistance, or (2) support the membrane with a graded filter having tighter porosity in those portions where a lower flux velocity is desired. In example 1, the plasma outflow channels underlying the membrane are narrowest near the blood exit and plasma must flow the entire length of the channel back toward the top of the device, joining additional plasma along the route before it is all collected in circumferential collection channel 89 as shown in FIGS. 1, 2, and 9. Thus, the lowest membrane support resistance is near the blood entrance while the highest such resistance is near the blood exit.

Accordingly, it is one object of the present invention to vary the resistance to plasma flow within the membrane support structure so that the natural local plasma flux velocity, U is everywhere just slightly below the critical flux velocity, $U_c$, described hereinabove for the conditions existing at all points along the membrane, provided further that $\overline{U}$, also defined hereinabove is, itself, not exceeded. Given this condition, concentration polarization of RBC will not occur anywhere along the membrane.

In the foregoing specification, reference has been made at various points to the separation of plasma from whole blood and the "collection of red blood cells." In all such references, the term "red blood cells" is intended to mean and does mean the collection of all corpuscular matter suspended in the blood and is not restricted merely to red blood cells alone.

REFERENCES

Au 1. Halow, J. S. and Wells, G. B., *Radial Migration of Spherical Particles in Couette Systems,* A. I. Ch. E. Journal, Vol. 16 No. 2, pp. 281-286, March 1970.

AV 2. Karnis, A., H. L. Goldsmith and S. G. Mason, *The Flow of Suspensions through Tubes.* V. Inertial Effects. Canad. J. Chem. Eng., Vol. 44, pp. 181-193, August 1966.

AW *3. Blatt, W. F., A. Dravid, A. S. Michaels and L. Nelson, *Solute Polarization and Cake Formation in Membrane Ultrafiltration: Cause, Consequences and Control Techniques,* In: Flinn, J. E., Ed. Membrane Science and Technology, New York, Plenum Press, pp. 47-97, 1970.

AX 4. Hallstrom, B., and Lopez-Leiva, M., *Description of a Rotating Ultrafiltration Module,* Desalination, Vol. 24, pp. 273-279, 1978.

AY 5. Solomon, B. A., F. Castino, J. J. Lysaght, C. K. Colton, and L. E. Friedman, *Continuous Flow Membrane Filtration of Plasma From Whole Blood,* Trans. Amer. Soc. Artif. Int. Organs, Vol. XXIV, pp. 21-26, 1978.

AZ *6 Farrell, P. C. Schindhelm, K., Roberts, C. G., Membrane Plasma Separation (In: Sieberth, H. G., Ed.) *Plasma Exhange.* Stuttgart: Schattauer Verlag. pp. 37-44, 1980.

BA 7. Werynski, A., P. S. Malchesky A. Sueoka, Y. Asanuma, J. W. Smith, K. Kayashima, E. Herpy, H. Soto and Y. Nose, *Membrane Plasma Separation: Toward Improved Clinical Operation,* Trans. Amer. Soc. Artif. Int. Organs, Vol XXVII, pp. 539-543, 1981.

BB 8. Porter, M. C., *Concentration Polarization with Membrane Ultrafiltration,* Ind. Eng. Chem. Prod. Res. Develop., Vol. II, No. 3, pp. 234-248, 1972.

BC 9. Schindhelm, K., Roberts, C. G., Farrell, P. C., *Mass Transfer Characteristics of Plasma Filtration Membranes.* Trans. Am. Soc. Artif. Intern. Organs, Vol. XXVII, pp. 554-558, 1981.

BD *10. Castino, F., Friedman, L. I., Solomon, B. A., Colton, C. K., Lysaght, M. J., *The Filtration of Plasma From Whole Blood: Novel Approach to Clinical Detoxification.* Publication #395, Blood Research Laboratory of the American National Red Cross.

BE 11. Zydney, A. L., and C. K. Colton, *Continuous Flow Membrane Plasmapheresis: Theoretical Models for Flux and Hemolysis Prediction,* Trans. Amer. Soc. Artif. Organs, Vol. XXXVIII, pp. 408-412, 1982.

BF* 12. Blackshear, P. L., Jr., R. J. Forstrom, F. D. Dorman and G. O. Voss, *Effect of Flow on Cells Near Walls,* Fed. Proc. Vol. 30, No. 5, pp. 1600-1609, 1971.

BG 13. Lopez-Leiva, M., *Ultrafiltration in Rotary Annular Flow,* Ph.D. Thesis Univ. of Lund, Sweden (1979).

BH 14. Lopez-Leiva, M., *Ultrafiltration at Low Degrees of Concentration Polarization: Technical Possibilities,* Desalination, Vol. 35 pp. 115-128, 1980.

BI 15. Strong, A. B. and Carlucci, L., *An Experimental Study of Mass Transfer in Rotating Couette Flow with Low Axial Reynolds Number.* The Canadian Journal of Chemical Engineering, Vol. 54, pp. 295-298, August 1976.

BJ* 16. Overcash, M., *A Couette Flow Oxygenator,* Ph.D. Thesis, Chemical Engl. Dept., University of Minnesota, 1972.

BK 17. Keller, K. H., *Effect of Fluid Shear on Mass Transport In Flowing Blood,* Fed. Proc., Vol. 30, No. 5, pp. 1591-1594, 1971.

BL 18. Margaritis, A. and Wilke, C. R., *Engineering Analysis of the Rotorfermentor,* Developments in Industrial Microbiology, Vol. 13, pp. 159-175, 1972. Symposium: Concentration of Microbial Cells.

BM 19. Blackshear, P. L., and Forstrom, R. J., *Fluid Dynamics of Blood Cells and Applications to Hemodialysis.,* NTIS Distribution #PB 243 183, Annual Report, Contract No. NIH-NIAMPP-72-2207, October 1974.

BN 20. Forstrom, R. J., Voss, G. O., and Blackshear, P. L., *Fluid Dynamics of Particle (Platelet) Deposition,* Trans. of the ASME, J. of Fluids Eng., p. 168-172, June, 1974.

BO 21. Forstrom, R. J., Bartlett, K., Blackshear, P. L., and Wood, T., *Formed Element Deposition Onto Filtering Walls,* Trans. American Soc. Artif. Int. Organs, Vol. XXI, pp. 602-607, 1975.

BP 22. Goldsmith, H. L., *The Flow of Model Particles and Blood Cells and Its Relation to Thrombogenesis,* "Progress in Hemostasis and Thrombosis" (Ed. T. H. Spaet), Grune and Stratton, Inc., NY, NY, pp. 97-139, 1972.

BQ 23. Saffman, P. G., *The Lift on a Small Sphere in a Slow Shear Flow,* J. Fluid Mech., Vol. 22, part 2, pp. 385-400, 1965.

*BR 24. Goldsmith, H. D., *Red Cell Motions and Wall Interaction in Tube Flow.,* Fed. Proc, Vol. 30, No. 5, pp. 1578-1590, 1971.

*BS 25. Karnis, A., H. L. Goldsmith and S. G. Mason, *The Kinetics of Flowing Dispersions.,* J. of Colloid and Interface Science, Vol. 22, pp. 531-553, 1966.

BT 26. Goldsmith, H. D., and S. G. Mason, *Particle Motions in Sheared Suspensions.,* J. of Fluid Mech., Vol. 12, Part 1, pp. 88-96, 1962.

BU 27. Goldman, A. J., Cox, R. G., and Brenner, H., *Slow Viscous Motion of a Sphere Parallel to a Plane Wall—II,* Couette Flow, Chemical Engineering Science, Vol 22, pp. 653-660, 1967.

*BV 28. Tam, C. K. W., *The Drag on a Cloud of Spherical Particles in Low Reynolds Number Flow,* J. Fluid Mech., Vol. 38, Part 3, pp. 537-546, 1969.

*BW 29. Chien, S., S. A. Luse and C. A. Bryant, *Hemolysis during Filtration through Micropores: A Scanning Electron Microscope and Hemorheologic Correlation.,* Microvascular Research, Vol. 3, No. 2, pp. 183-203, April, 1971.

BX 30. Chien, S., et. al., *Plasma Trapping in Hematocrit Determination. Differences among animal species.,* Proc. of the Soc. for experimental Biology and Medicine, Vol. 119, No. 4, pp. 1156-7, 1965.

BY 31. Chien, S., Biorheology, Vol. 8, p. 48, 1971.

*BZ 32. Kays, W. M., London, A. L., *Compact Heat Exchangers.* McGraw-Hill, New York, N.Y., 1955.

CA 33. Blackshear, P. L., Jr., *Hemolysis at Prosthetic Surfaces,* In: Chemistry of Bio-Surfaces, Vol. 2, (Ed., M. L. Hair) Marcel-Dekker Pub. Co., New York, 1972.

CB 34. Shapiro, S. I., and Williams, M. C., *Hemolysis in Simple Shear Flows,* J. A. I. Ch. E., vol. 16, No. 4, pp 575-579, 1970.

CC 35. Yarborough, K. A. and Mockros, L. G., *Hemolysis Rates for Blood Flow in Pipes,* Proc. 18th Annual Conf., Engineering in Medicine and Biology, p. 47, 1965.

CD 36. Nevaril, C. G., Lynch, E. C., Alfrey, C. P. Jr., and Hellums, J. D., *Erythrocyte Damage and Destruction Induced by Shearing Stress,* J. Lab & Clin. Med., Vol. 71, Number 5, pp. 784-790, May 1968.

CE 37. Nevaril, C. G., Hellums, J. D., Alfrey, C. P. Jr., and Lynch, E. C., Physical Effects in Red Blood Cell Trauma, A. I. Ch. E. Journal, Vol. 15, No. 5, pp. 707-711, September 1969.

CF 38. Sutera, S. P., Croce, P. A., and Mehrjardi, M.; *Hemolysis and Subhemolytic Alterations of Human RBC Induced by Turbulent Shear Flow,* Trans. Amer. Soc. Artif. Int. Organs, Vol. XVIII, pp. 335-341. 1972.

CG 39. Blackshear, P. L. Jr., Dorman, F. D., Steinback, J. H., Maybach, E. J., Singh, A., and Collingham, R. E., *Shear Wall Interaction and Hemolysis,* Trans. Amer. Soc. Artif. Int. Organs, Vol. XII, pp. 113-120, 1966.

CH*40. Keller, K. H., and S. I. Yum, *Erythrocyte-Tube Wall Interactions in Laminar Flow of Blood Suspensions,* Trans. Amer. Soc. Artif. Int. Organs. Vol. XVI, pp. 42-48, 1970.

CI*41. Rand, P. W., Lacombe, E., Hunt, H. E., Austin, W. H., *Viscosity of Normal Human Blood Under Normothermic and Hypothermic Conditions.* J. Appl. Physiol. Vol. 19, Part 1, pp. 117-122, 1964.

CJ*42. Forstrom, R. J., Membrane Strength—*The Jet Fragility Test,* Ph.D. Thesis, University of Minnesota, 1969.

CK*43. Wood, T. W., *Deposition of Red Blood Cells onto Filtering Surfaces.,* M.Sc. Thesis, Dept. of Mech. Eng., University of Minnesota, 1974.

What is claimed is:

1. A method of separating fluid from a fluid suspension using a couette membrane filter having facing surfaces which define a gap therebetween, there being inlet means for introducing fluid into the gap, and outlet means for removing fluid from the gap remotely from said inlet means, comprising the steps of:
    (1) locating the facing surfaces of the filter in coaxial relation:
    (2) mounting a semi-porous membrane having a plurality of pores on at least one of said facing surfaces;
    (3) increasing the thickness of the gap between the facing surfaces from inlet to outlet to compensate for changes in suspension viscosity;
    (4) introducing the fluid suspension into the gap between the facing surfaces of the filter;
    (5) rotating one surface coaxially relative to the other; and
    (6) controlling the relative speed of rotation of the facing surfaces such that shear stress imparted to the fluid suspension is maintained at a constant value below a certain predetermined level whereby fluid from the suspension passes through the pores of the membrane.

2. A method according to claim 1 wherein the speed of rotation and local radii of the facing surfaces are selected to provide a uniform ratio of local gap thickness to local fluid suspension viscosity to maintain said constant value of shear stress.

3. A method according to claim 2 wherein the fluid is withdrawn at a rate such that the rate of withdrawal of the fluid does not exceed predetermined filtration velocities on the surface of the membrane.

4. A method according to claim 3 including the step of supporting the membrane by means of a plurality of ribs and channels incorporated into each surface upon which a membrane is mounted.

5. A method according to claim 4 wherein the fluid suspension is whole blood and the shear stress is maintained below the value at which significant hemolysis occurs.

6. A method according to claim 5 including the step of maintaining the gap at a predetermined minima along the path of the fluid and maintaining the speed of rotation of the surfaces relative to each other such that the shear stress to which the blood is subject does not exceed 1500 dynes/cm$^2$.

7. A method according to claim 5 wherein the dimension and geometry of the gap, the flow rates and the angular velocity are maintained in a predetermined relation such that the variation of the Taylor number for whole blood is maintained at a minimum over the entire longitudinal extent of the membrane.

8. In the method of operating filter apparatus to separate blood components in a fluid suspension, including:
    (a) a first surface of revolution;
    (b) a membrane having a plurality of pores therethrough, the membrane defining a second surface of revolution spaced from and facing the first surface and defining therewith a shear gap of predetermined radial dimensions which are non-uniform in the axial length direction of the membrane, said first and second surfaces extending coaxially,
    (c) inlet means for introducing the fluid suspension into the gap;
    (d) means for rotating one of said surfaces about its axis of revolution relative to the other surface and at an angular velocity such that shear stress is imposed on the fluid suspension in the gap and laminar flow of the fluid suspension in the gap is created whereby fluid is separated from the fluid suspension and passes through the membrane pores; and
    (e) first outlet means for removal of fluid passing through the membrane pores, and other outlet means for removing fluid from the gap remotely from the inlet means, the steps that include:
    (f) introducing the fluid suspension into the gap between the first and second surfaces;
    (g) operating said means for rotating one surface relative to the other; and
    (h) controlling the speed of said relative rotation, whereby fluid passage through the pores of the membrane is maintained along the length of the membrane, said suspension consisting of blood from which fluid plasma is to be separated, the blood filling the gap, and including the steps,
    (i) producing laminar flow regions adjacent the pores and producing Taylor vortices in the gap, adjacent said laminar flow regions, with Taylor number maintained essentially constant over the length of the membrane,
    (j) and increasing the thickness of the gap between said surfaces, along length of the membrane between the inlet means and the other outlet means and in a direction toward said other outlet means to compensate for changes in fluid viscosity such that the shear stress imparted to the fluid suspension in and along the gap region adjacent the membrane pores is maintained substantially constant and below a level at which a component of the blood in the suspension would otherwise be damaged.

9. A method according to claim 8 wherein the apparatus is vertically oriented and the fluid suspension in the gap flows from the inlet means to said other outlet means under the influence of differential pressure and gravity.

10. A method according to claim 9 wherein the fluid suspension is whole blood, the fluid extracted from the suspension via the membrane pores is plasma, and the remaining portion of the fluid contains concentrated red blood cells and other blood particulate matter.

11. A method according to claim 8 wherein gap dimensions are selected at predetermined minimum values and the angular velocity of the one surface is controlled such that the blood is subjected to shear stress slightly less than the shear stress at which significant hemolysis begins to occur.

12. A method according to claim 11 wherein the angular velocity is selected such that the Taylor number for the blood in the gap does not exceed 1000.

13. A method according to claim 11 wherein the shear stress to which the blood is subjected does not exceed 1500 dynes/cm$^2$.

14. A method according to claim 8 including varying the resistance to flow of fluid passing through the membrane such that resistance to such flow increases at locations corresponding to locations of gap increasing radial dimensions.

15. A method according to claim 8 including the step of controlling the speed of rotation such that the Taylor number for the blood in the gap does not exceed 1000.

16. A method according to claim 8 including the steps of maintaining the gap dimension, flow rate, trans-membrane pressure and angular velocity at values such that the rate of withdrawal of fluid via membrane pores does not exceed the critical filtration velocity for blood anywhere on the surface of the membrane.

* * * * *